US008040575B2

(12) United States Patent
Eom et al.

(10) Patent No.: US 8,040,575 B2
(45) Date of Patent: Oct. 18, 2011

(54) DOUBLE SIDE IMAGE SCANNER

(75) Inventors: Gi-Yeong Eom, Uiwang-si (KR);
Jong-Kook Lah, Seoul (KR);
Chung-Yong Suh, Seoul (KR)

(73) Assignee: Wisecube Co., Ltd., Seoul (KR)

( * ) Notice: Subject to any disclaimer, the term of this patent is extended or adjusted under 35 U.S.C. 154(b) by 1469 days.

(21) Appl. No.: 11/383,181

(22) Filed: May 12, 2006

(65) Prior Publication Data
US 2006/0256391 A1 Nov. 16, 2006

(30) Foreign Application Priority Data

May 14, 2005 (KR) .......................... 10-2005-0040418
Nov. 15, 2005 (KR) .......................... 10-2005-0109230

(51) Int. Cl.
*H04N 1/04* (2006.01)
*H04N 1/46* (2006.01)

(52) U.S. Cl. ........ 358/474; 358/505; 358/488; 399/371; 399/374; 235/380

(58) Field of Classification Search .................. None
See application file for complete search history.

(56) References Cited

U.S. PATENT DOCUMENTS

| | | | | |
|---|---|---|---|---|
| 3,209,152 A | * | 9/1965 | Brouwer | 250/202 |
| 5,461,492 A | * | 10/1995 | Jones | 358/487 |
| 5,556,145 A | * | 9/1996 | Takasaki | 292/336.3 |
| 6,075,623 A | * | 6/2000 | Yun | 358/486 |
| 7,561,313 B2 | * | 7/2009 | Endo | 358/496 |
| 7,712,891 B2 | * | 5/2010 | Ishida et al. | 347/104 |
| 2001/0012132 A1 | * | 8/2001 | Kaji | 358/474 |
| 2002/0051220 A1 | * | 5/2002 | Tanaka et al. | 358/400 |
| 2002/0141804 A1 | * | 10/2002 | Ono et al. | 400/120.01 |
| 2003/0123110 A1 | * | 7/2003 | Fang et al. | 358/520 |
| 2005/0242172 A1 | * | 11/2005 | Murata | 235/380 |

* cited by examiner

*Primary Examiner* — Sudhanshu Pathak
*Assistant Examiner* — Huo Long Chen
(74) *Attorney, Agent, or Firm* — Lowe Hauptman Ham & Berner LLP

(57) ABSTRACT

A double side image scanner includes a case having a medium guide track with a reference loading line, a main frame mounted inside the case, a first roll feed including a first feed roller mounted on a front side of the guide track and a first idle roller disposed above the first feed roller for cooperating with the first feed roller to load the medium, a second roll feed including a second feed roller mounted on a rear side of the guide track and a second idle roller disposed above the second feed roller for cooperating with the second feed roller to load the medium, a drive device for rotating the first feed roller and the second feed roller, first and second image sensors for scanning opposite surfaces of the medium to acquire image data, and a tracking device for biasing the medium toward the reference loading line.

18 Claims, 22 Drawing Sheets

DOUBLE SIDE IMAGE SCANNER

RELATED APPLICATIONS

The present application is based on, and claims priority from, Korea Application Number 2005-40418, filed May 14, 2005 and Korean Application Number 2005-109230, filed Nov. 15, 2005, the disclosures of which are hereby incorporated by reference herein in their entirety.

FIELD OF THE INVENTION

The present invention is directed to a double side image scanner and, more specifically, to a double side image scanner capable of simultaneously scanning images from opposite surfaces of a medium in an increased image quality.

BACKGROUND OF THE INVENTION

A scanner is an image input equipment that optically scans storage media, such as documents, drawings, photos, films and the like, and converts analog signals indicative of the intensity of a light reflected or transmitted to digital signals to thereby input digitized images. When in use, the image scanner is interfaced with a computer.

Conventional image scanners are adapted to scan one surface of a medium by keeping the medium immovable and displacing an image sensor, e.g., a charged coupled device (CCD) or an amorphous semiconductor, with respect to the medium. In case of a medium having a size similar to that of a credit card, for example, an identification card or a name card, the image scanners act to scan one surface of the medium while loading the medium to the image sensor through the actuation of a roll feed.

There have been usually employed card reader writers, examples of which include an automated teller machine, a card telephone and a ticketing machine each adapted for reading and writing data from and on a magnetic card as an example of the media. The magnetic card is comprised of a plastic card and a magnetic stripe attached to the plastic card for storage of data in a readable and writable manner. Under Article 7811 of the regulations prescribed by the International Standardization Organization, the magnetic stripe is attached along one lateral side of the plastic card. The data stored in the magnetic stripe are read by a magnetic stripe reader (MSR) of a card reader writer.

Such a magnetic card is provided with varying kinds of forgery-proof elements, e.g., a barcode, a hologram and so forth, cryptographically marked on one surface thereof for forgery prevention purpose. Images of the forgery-proof elements are scanned and converted to image data by means of an image sensor, which image data are then deciphered by a computer program and compared with character information of the magnetic card to verify the authenticity the magnetic card.

However, the conventional image scanners are designed to sequentially scan one and the other surfaces of a medium one by one, which is highly time-consuming and cumbersome-to-use. In particular, the speed at which an image sensor or a medium is loaded imposes a significant restriction on the responsiveness of the image sensor. In other words, it is very difficult to shorten the scanning time due to the design constraint that the loading speed should be inversely proportional to the resolution of the image sensor in order to obtain image data of increased accuracy.

In the meantime, at the time of loading deformed magnetic cards, for example, bent or crushed magnetic cards, a feed roller and an idle roller of a roll feed are spaced apart from each other to accommodate the deformation of the magnetic card. This leads to unrestrained movement and reduced friction, namely, slipping, of the magnetic cards, which may cause a problem of jitter. Moreover, what is called a spacing loss is created between the magnetic cards and the magnetic stripe reader, which may give rise to an error in reading out the data stored in the magnetic cards.

Furthermore, the magnetic cards exhibit deviation in size from manufacturer to manufacturer. The size deviation poses a problem in that the magnetic stripe reader may suffer from a tracking error when tracking the magnetic stripe. The conventional image scanners are not provided with any mechanism that can load the magnetic cards along a reference loading line of a track to assure accurate tracking of the magnetic stripe reader relative to the magnetic stripe. Thus, the image scanners have no ability to control the unrestrained movement of the magnetic cards and to compensate the size deviation of the magnetic cards. As a result, a loading error may be incurred that the magnetic cards are not loaded rectilinearly but turned in a loading process. In addition, severe distortion appears in the image acquired and the magnetic cards are often jammed when loaded.

SUMMARY OF THE INVENTION

Taking into account the above and other problems inherent in the prior art, it is an object of the present invention to provide a double side image scanner capable of simultaneously scanning images from opposite surfaces of a medium in an increased image quality and with enhanced scanning accuracy and reliability.

Another object of the present invention is to provide a double side image scanner that can prevent any loading error with a simple structure and can make accurate and smooth rectilinear loading and constant-speed loading come true.

A further object of the present invention is to provide a double side image scanner that can compensate deformation of a medium through the use of a pressing structure, thus minimizing distortion of an image.

A still further object of the present invention is to provide a double side image scanner that has an ability to dislodge contaminants on an image sensor and a magnetic stripe reader, while allowing the jam of a medium to be removed with ease.

A yet still further object of the present invention is to provide a double side image scanner that makes it possible to load a medium from the front side and the rear side of the image scanner, thereby improving the convenience in scanning.

A yet still further object of the present invention is to provide a double side image scanner that has a magnetic stripe reader designed to scan images of a medium and also to read the data of a magnetic stripe attached to the medium.

A yet still further object of the present invention is to provide a double side image scanner that allows a magnetic stripe reader to accurately and stably track a magnetic stripe through the use of a simple mechanism.

With these objects in view, the present invention provides a double side image scanner comprising: a case having a top surface and a guide track provided on the top surface for guiding a medium, the guide track having a reference loading line; a main frame mounted inside the case; a first roll feed including a first feed roller mounted on a front side of the guide track and a first idle roller disposed above the first feed roller for cooperating with the first feed roller to load the medium; a second roll feed including a second feed roller mounted on a rear side of the guide track and a second idle roller disposed above the second feed roller for cooperating with the second feed roller to load the medium; a drive means for rotating the first feed roller and the second feed roller; a first image sensor provided on the guide track between the first feed roller and the second feed roller for scanning one surface of the medium to acquire image data; a second image sensor provided between the first idle roller and the second idle roller for scanning the other surface of the medium to acquire image data; and a tracking means provided at one side of the main frame for pushing and biasing a first flank end of the medium toward the reference loading line to bring a second flank end of the medium into alignment with the reference loading line.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Figure 1:
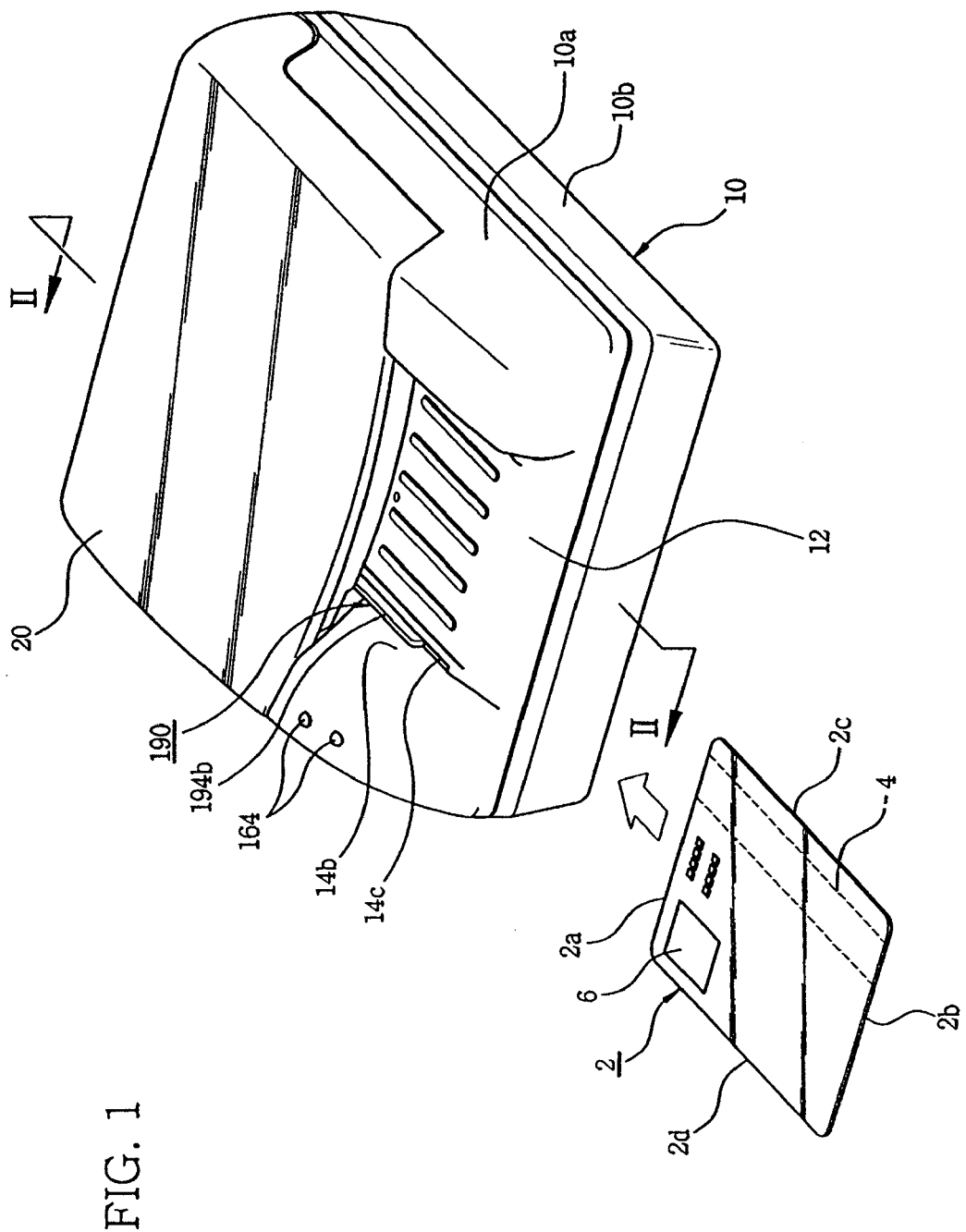
FIG. 1 is a perspective view showing the overall configuration of a double side image scanner in accordance with the present invention.

Preferred embodiments of a double side image scanner according to the present invention will now be described in detail with reference to the accompanying drawings.

Referring first to FIGS. 1 through 5, a double side image scanner of the present invention includes a case 10 and a cover 20, both of which cooperate to form a shell of the double side image scanner. The cover 20 is openably attached to the top portion of the case 10. The case 10 is comprised of a top half part 10a and a bottom half part 10b. On the top center area of the case 10, there is provided a guide track 12 for guiding the loading movement of a medium 2 having a size, e.g., similar to that of a magnetic card or an identification card. The medium 2 is loaded and unloaded from the front side of the case 10 through the guide track 12. In FIGS. 1, 4, 13 and 14, there is illustrated a magnetic card, as one example of the medium 2, on one surface of which a magnetic stripe 4 attached. The medium 2 is of a generally rectangular shape and has a front end 2a, a rear end 2b, a first flank end 2c and a second flank end 2d. The magnetic stripe 4 is attached to the lower surface of the medium 2 in the vicinity of the first flank end 2c, namely, the right side end. A forgery-proof element 6 is marked on the upper surface of the medium 2.

At the lateral sides of the guide track 12, first and second side walls 14a and 14b are formed along the loading direction of the medium 2 in a mutually parallel relationship so that they can support and guide the first and second flank ends 2c and 2d of the medium 2. A slot 14c that extends along the loading direction of the medium 2 is formed at the corner portion at which the guide track 12 meets with the second side wall 14b. First and second apertures 16a and 16b are formed at the front and rear areas of the guide track 12 and a third aperture 16c is formed between the first and second apertures 16a and 16b. A pair of fourth apertures 16d are formed on the top lateral surfaces of the case 10 in the vicinity of the first and second side walls 14a and 14b, whereas a fifth aperture 16e is formed on the guide track 12 adjacent to the first side wall 14a between the first aperture 16a and the third aperture 16c. First and second sensor holes 18a and 18b are formed on the guide track 12 in front of and at the rear of the first aperture 16a.

Referring to FIGS. 2, 3, 4, 7 and 8 through 12, a main frame 30 is mounted inside the case 10 in such a fashion that the rear end portions of the main frame 30 protrude backwards. The main frame 30 includes a pair of base plates 32 extending along the medium loading direction in a spaced-apart parallel relationship with each other and a pair of curved side panels 34 projecting from the base plates 32 along the medium loading direction in a mutually spaced-apart parallel relationship. The side panels 34 are kept spaced apart by a plurality of spacer bars 36 to have an interval greater than the width of the medium 2. A printed circuit board 38 is supported beneath the main frame 30 by means of a plurality of spacers 38a in a spaced-apart relationship with respect to the main frame 30.

Figure 2:
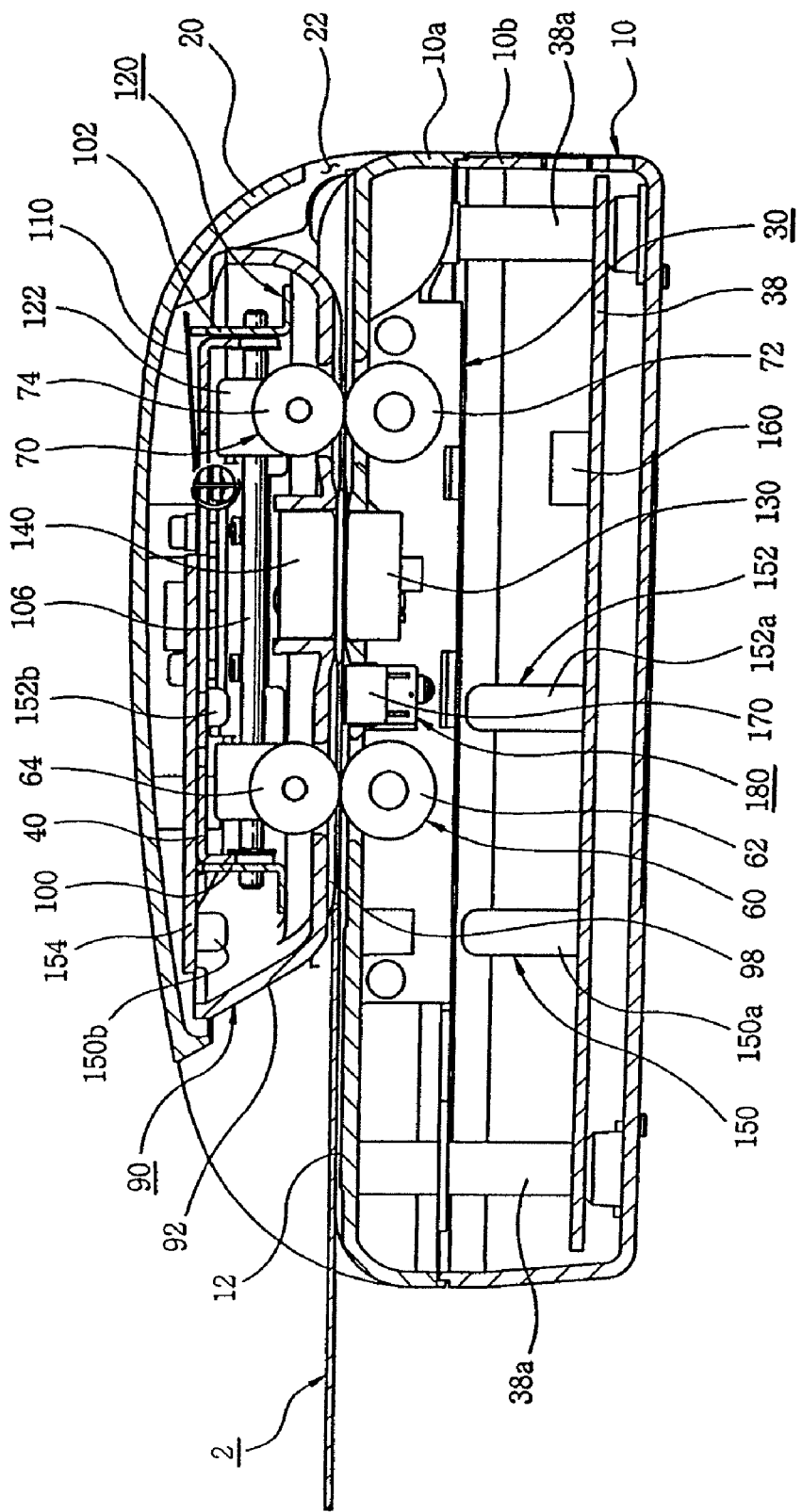
FIG. 2 is a cross-sectional view taken along line II-II in FIG. 1.
Figure 3:
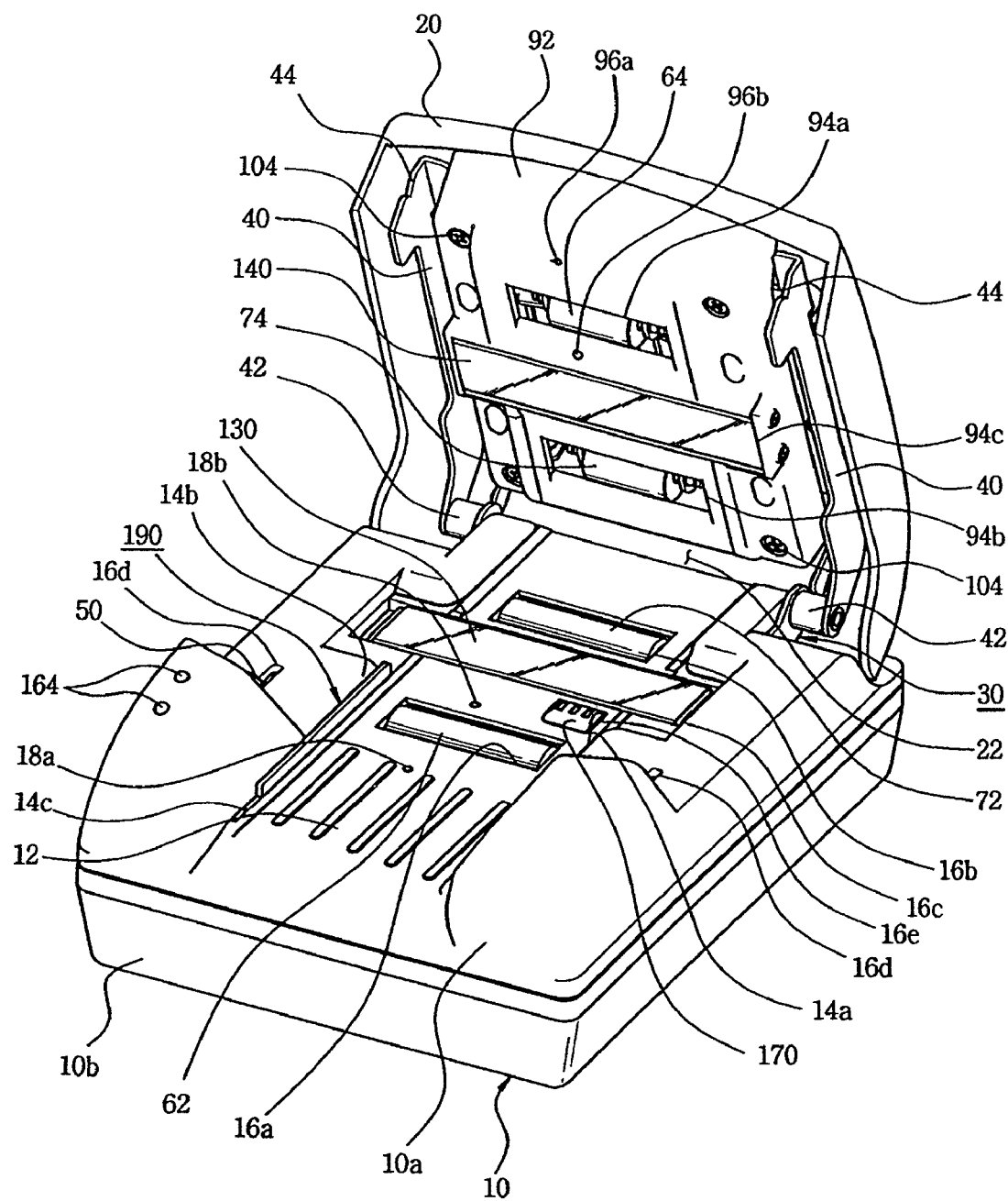
FIG. 3 is a perspective view depicting a double side image scanner in accordance with the present invention, with its cover opened.

As illustrated in FIGS. 2 and 3, an inlet outlet opening 22 through which the medium 2 can be loaded and unloaded is formed at the rear of the case 10 and the cover 20 in a coplanar relationship with the guide track 12. As is apparent in FIGS. 2, 3, 9, 11 and 12, a moving frame 40 is provided underneath the cover 20 and concealed by the latter. The moving frame 40 is connected at its rear portions to the rear portions of the main frame 30 for rotation about a pair of pivots 42, with a sufficiently great gap left between the case 10 and the moving frame 40 for the purpose of loading the medium 2. A pair of locking grooves 44 are formed on the front lateral sides of the moving frame 40 and a pair of locks 50 for locking and unlocking the moving frame 40 are fastened to the front lateral sides of the main frame 30 by virtue of screws 52. The locks 50 have snap hooks 54 adapted to engage with the corresponding one of the locking grooves 44 of the moving frame 40 through the fourth apertures 16d of the case 10, thereby restraining the rotation of the moving frame 40.

Referring to FIGS. 2, 3, 7-12 and 16a-16e, a first feed roller 62 of a first roll feed 60 and a second feed roller 72 of a second roll feed 70 for loading and unloading the medium 2 are mounted on the front and the rear portions of the main frame 30 for rotation about shafts 62a and 72a, respectively. The first and the second feed rollers 62 and 72 protrude above the guide track 12 through the first and second apertures 16a and 16b of the case 10 so that they can make contact with the medium 2 as the latter is loaded along the guide track 12. The axes of the first and the second feed rollers 62 and 72 are aligned on a first arbitrary plane P1. The first feed roller 62 has a diameter R1 larger than the diameter R2 of the second feed roller 72. If the diameter R1 of the first feed roller 62 is selected to be greater than the diameter R2 of the second feed roller 72 in this way, the loading operation of the medium 2 is mainly performed through the guide track 12. In order to have a frictional force great enough to facilitate the loading operation, the first feed roller 62 and the second feed roller 72 are preferably made of a soft material, e.g., urethane resin. One or more roll feed or feed roller may be further provided respectively in front of the first roll feed 60 and the at the rear of the second roll feed 70 in an effort to facilitate the loading and unloading operation of the medium 2. Alternatively, the diameter R1 of the first feed roller 62 may be selected to become smaller than the diameter R2 of the second feed roller 72, in which case the loading operation of the medium 2 is mainly performed through the inlet outlet opening 22 formed at the rear portions of the case 10 and the cover 20.

Furthermore, the first roll feed 60 and the second roll feed 70 include first and second idle rollers 64 and 74 that cooperate with the first feed roller 62 and the second feed roller 72 to load and unload the medium 2. The first and second idle rollers 64 and 74 are mounted on the top of the first feed roller 62 and the second feed roller 72 so that they can rotate about shafts 64a and 74a and move vertically toward and away from the first feed roller 62 and the second feed roller 72. The axes of the first and second idle rollers 64 and 74 are aligned on a second arbitrary plane P2 parallel to the first plane P1 noted above. The first and second feed rollers 62 and 72 and the first and second idle rollers 64 and 74 remain in contact with each other in an initial operation mode where the medium 2 is not loaded. If the front end 2a of the medium 2 is caused to enter between the first and second feed rollers 62 and 72 and the first and second idle rollers 64 and 74, then the first and second idle rollers 64 and 74 are raised up by the pushing force of the medium 2 thus allowing the medium 2 to move forward.

As shown in FIGS. 7 through 12, the first feed roller 62 and the second feed roller 72 are rotated by the actuation of a drive device 80 attached to the rear portion of the main frame 30. The drive device 80 includes a motor 82 for generating a drive force, a gear arrangement 84 for transmitting the drive force of the motor 82 to the second feed roller 72 and a belt transmission mechanism 86 for transmitting the rotational force of the second feed roller 72 to the first feed roller 62. The gear arrangement 84 includes a worm 84a attached to the spindle 82a of the motor 82 and a worm wheel 84b attached to the shaft 72a of the second feed roller 72 for meshing engagement with the worm 84a. The belt transmission mechanism 86 includes a driving pulley 86a attached to the shaft 72a of the second feed roller 72 at the opposite portion from the worm wheel 84b, a driven pulley 86b mounted to the shaft 62a of the first feed roller 62 and a belt 86c wound around the driving pulley 86a and the driven pulley 86b. If needed, the belt transmission mechanism 86 may be comprised of a timing belt mechanism.

The drive force of the motor 82 is first transferred to the second feed roller 72 through the worm 84a and the worm wheel 84b of the gear arrangement 84 and then transmitted to the first feed roller 62 via the driving pulley 86a, the driven pulley 86b and the belt 86c of the belt transmission mechanism 86. Use of the gear arrangement 84 and the belt transmission mechanism 86 makes sure that, when loading the medium 2, the medium 2 is accurately and stably loaded with no unwanted displacement which would otherwise be caused by the backlash of the worm 84a and the worm wheel 84b.

Referring to FIGS. 2, 3, 13 and 16a-16e, a pressing device 90 is provided underneath the moving frame 40 in such a manner that it can press the medium 2 against the guide track 12 into flat configuration to thereby compensate the flexural deformation of the medium 2. The pressing device 90 has an inner pressing cover 92 vertically movably mounted underneath the moving frame 40 for pressing the medium 2. The inner pressing cover 92 is provided at its bottom portion with a first front aperture 94a, a second rear aperture 94b and a third middle aperture 94c lying between the first aperture 94a and the second aperture 94b. The first and second apertures 94a and 94b of the inner pressing cover 92 are aligned with the first and second apertures 16a and 16b of the case 10. The first and second idle rollers 64 and 74 protrude through the first and second apertures 94a and 94b of the inner pressing cover 92 such that they can make contact with the medium 2 moving along the guide track 12 or the first and second feed rollers 62 and 72.

Figure 16A:
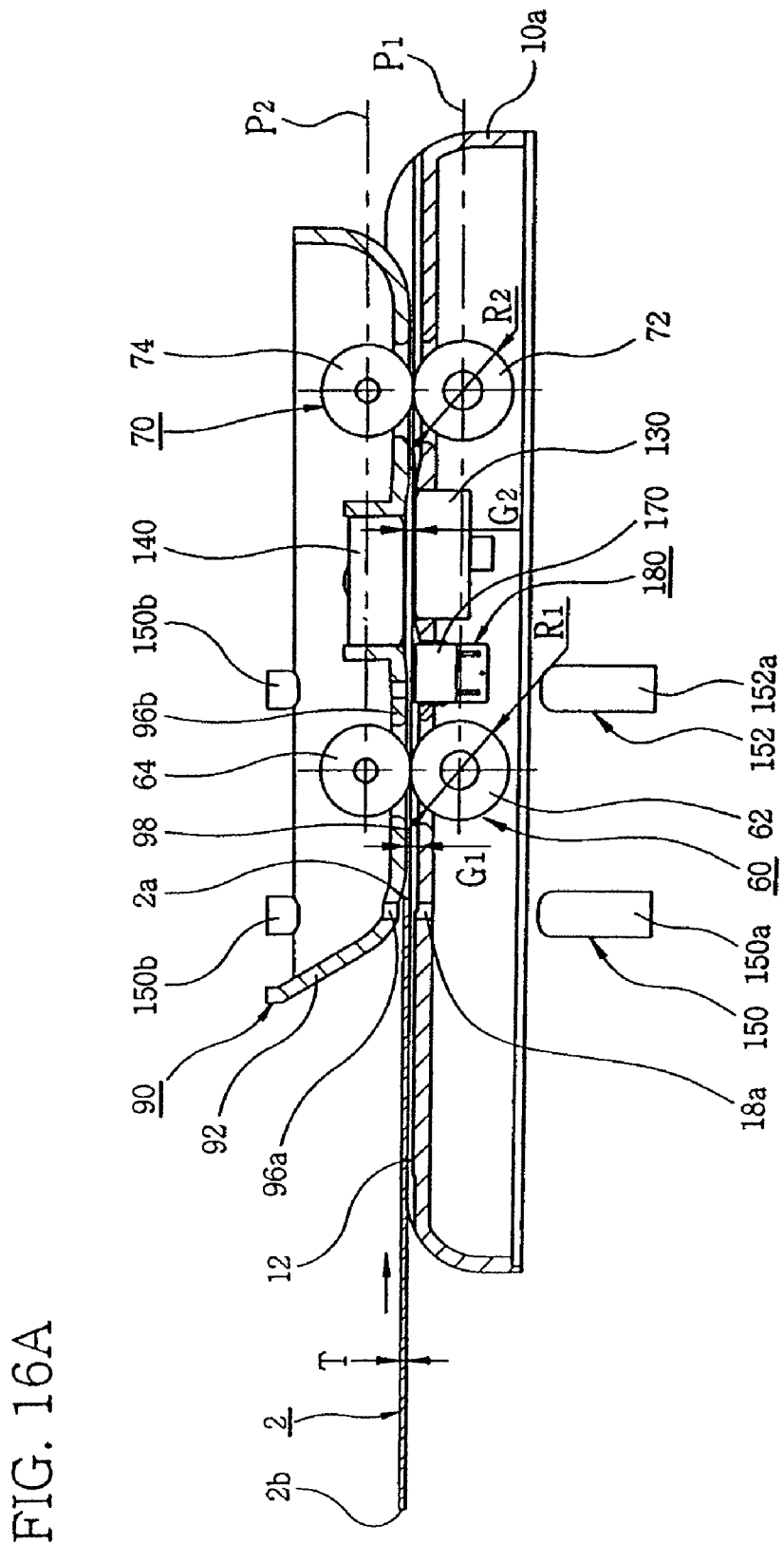
FIGS. 16a through 16e are views for explaining operations of a first roll feed, a second roll feed, an inner pressing cover, a first image sensor, a second image sensor, a first medium sensor and a second medium sensor employed in a double side image scanner in accordance with the present invention.
Figure 16B:
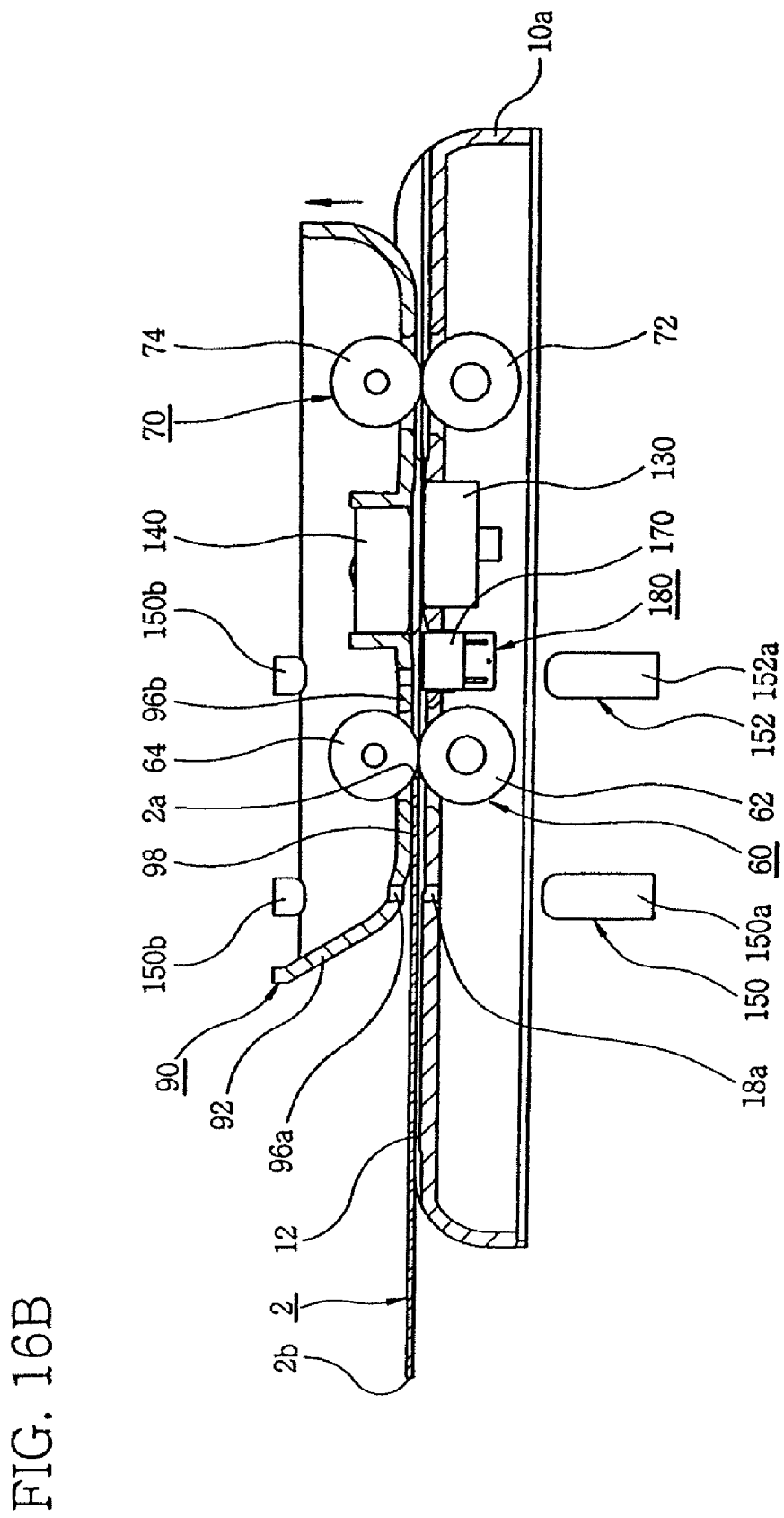

Moreover, at the front and rear sides of the first aperture 94a, the inner pressing cover 92 has first and second sensor holes 96a and 96b respectively formed in alignment with the sensor holes 18a and 18b of the case 10. In between the guide track 12 of the case 10 and the underside of the inner pressing cover 92, a loading track 98 along which the medium 2 is loaded is formed in alignment with the guide track 12. As shown in FIG. 16a, the initial gap G1 of the loading track 98 between the guide track 12 of the case 10 and the underside of the inner pressing cover 92 is selected to become smaller than the thickness T of the medium 2.

Referring to FIGS. 2, 3 and 9-13, first and second brackets 100 and 102 are fastened to the top front and rear sides of the inner pressing cover 92 by a plurality of screws 104. The first bracket 100 has first and second guide slots 100a and 100b at its lateral side areas, and the second bracket 102 is provided at its lateral side areas with first and second guide slots 102a and 102b aligned with the first and second guide slots 100a and 100b of the first bracket 100 in a corresponding relationship.

First shaft 106 and second shaft 108 are secured to the lateral sides of the first and second brackets 100 and 102 in such a manner that they can extend along the medium loading direction in a mutually parallel relationship. The opposite ends of the first shaft 106 are vertically movably inserted into the first guide slot 100a of the first bracket 100 and the first guide slot 102a of the second bracket 102, while the opposite ends of the second shaft 108 are vertically movably inserted into the second guide slot 100b of the first bracket 100 and the second guide slot 102b of the second bracket 102. The first shaft 106 and second shaft 108 are displaceable along the first and second guide slots 100a, 100b, 102a and 102b of the first and second brackets 100 and 102 to thereby have the inner pressing cover 92 make rectilinear up-down movement.

Figure 13:
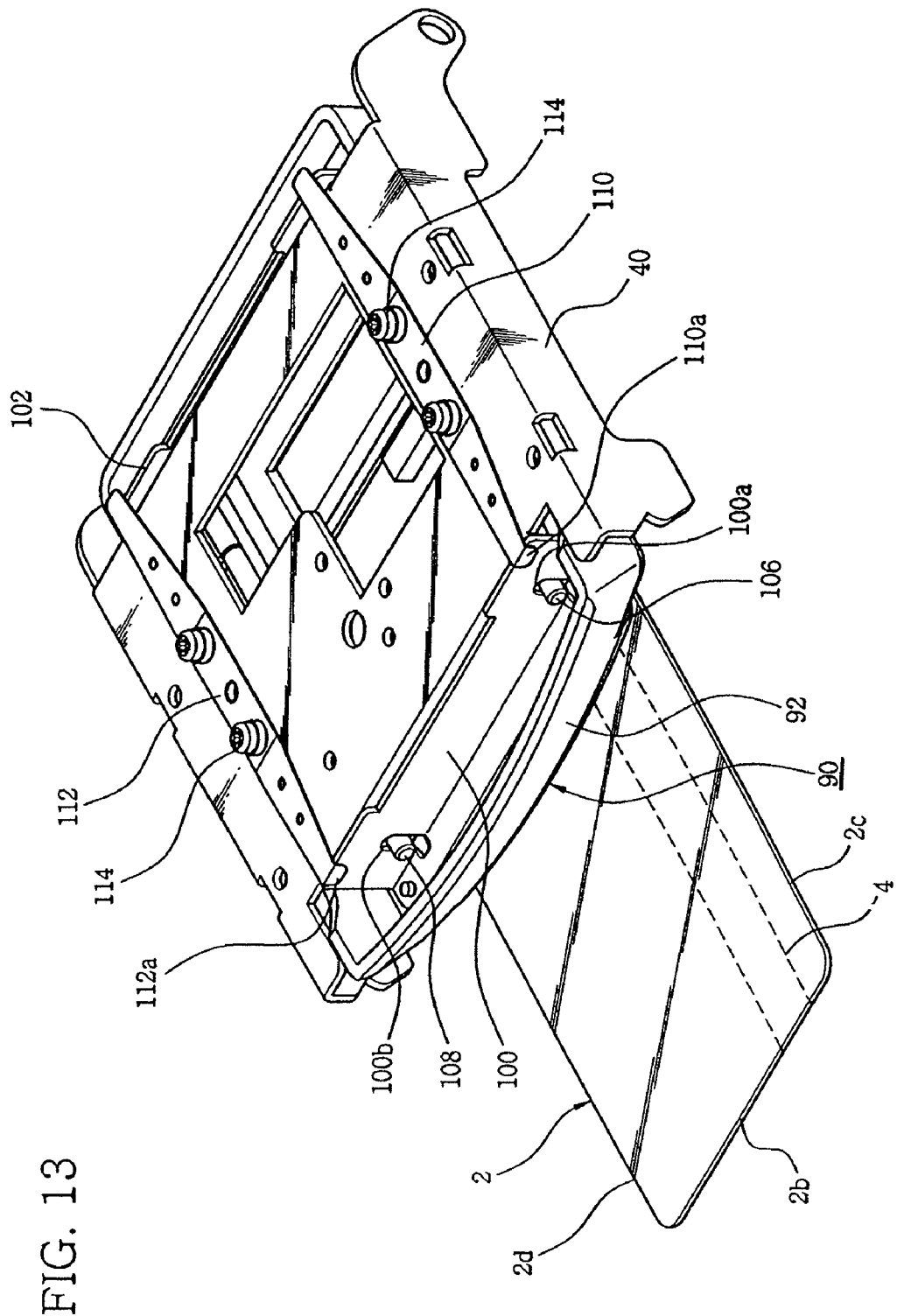
FIG. 13 is a perspective view showing the configuration of a moving frame and a pressing device employed in a double side image scanner in accordance with the present invention.
Figure 14:
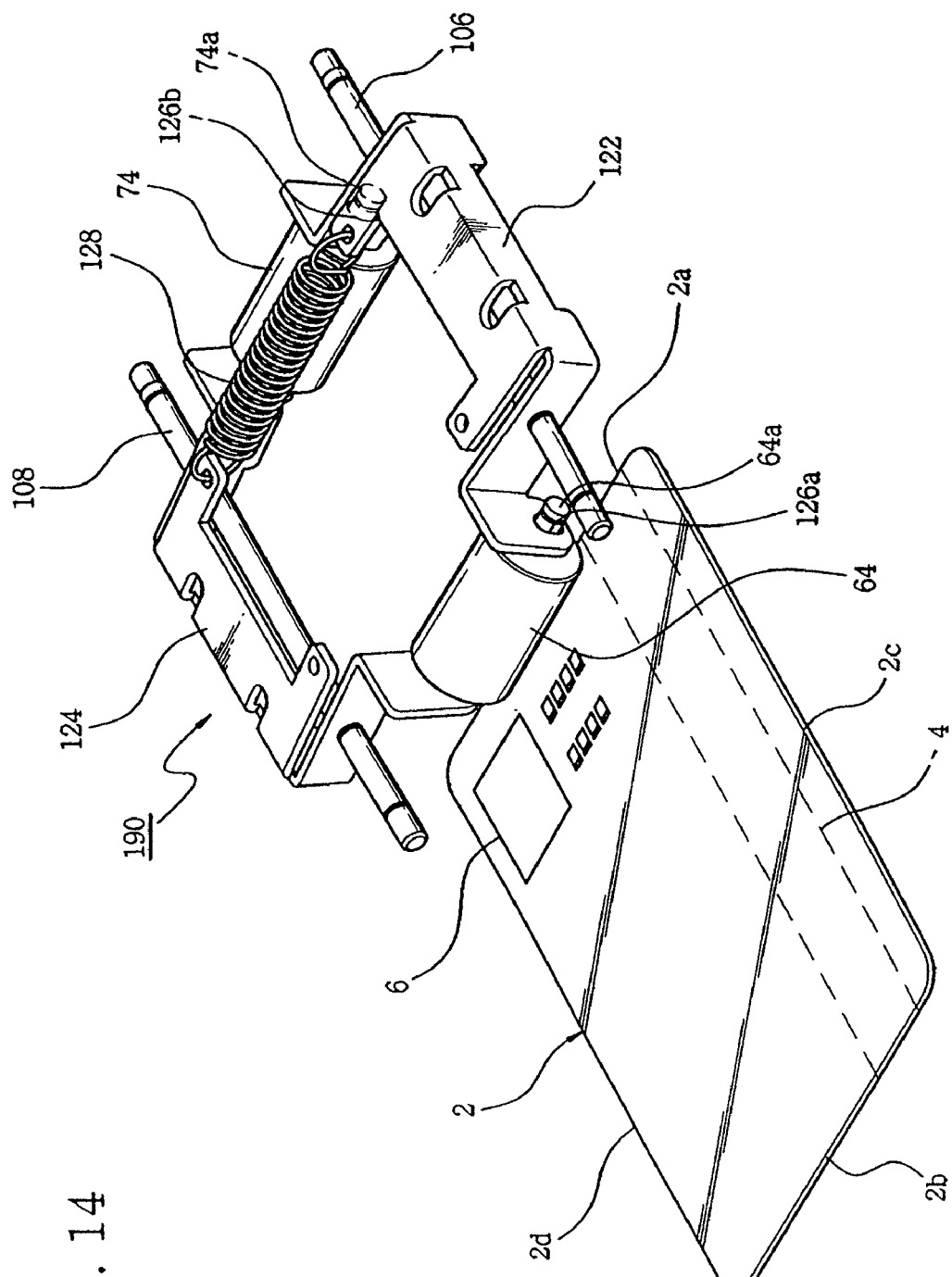
FIG. 14 is a perspective view showing the configuration of a first idle roller, a second idle roller and a link device employed in a double side image scanner in accordance with the present invention.

The inner pressing cover 92 of the pressing device 90 is resiliently biased by means of first and second leaf springs 110 and 112 so as to press the medium 2. The first and second leaf springs 110 and 112 are mounted on the top surface of the moving frame 40 by means of screws 114 such that they can extend along the medium loading direction in a mutually parallel relationship. The opposite ends of the first and second leaf springs 110 and 112 are adapted to press the top portions of the first and second brackets 100 and 102 with a resilient force. The first and second leaf springs 110 and 112 are bent at their one ends to form stoppers 110a and 112a that engage with the one ends of the first and second brackets 100 and 102 to restrain the same. Restraining the first and second brackets 100 and 102 in this manner precludes the possibility that the inner pressing cover 92 is moved along the medium loading direction. Although FIG. 13 illustrates that the stoppers 110a and 112a are formed at the rear ends of the first and second leaf springs 110 and 112, they may be formed at the front ends or at the front and rear ends of the first and second leaf springs 110 and 112, if desired. The first and second leaf springs 110 and 112 may be replaced with a compression coil spring that lies between the cover 20 or the moving frame 40 and the inner pressing cover 92 to urge the inner pressing cover 92 in a downward direction.

Referring to FIGS. 2, 9, 11, 12 and 14, the double side image scanner of the present invention further includes a link device 120 for causing the first and second idle rollers 64 and 74 of the first and second roll feeds 60 and 70 to move vertically with respect to the first feed roller 62 and the second feed roller 72. The link device 120 includes, among others, the first and second shafts 106 and 108 of the pressing device 90 that are vertically movably inserted into the first and second guide slots 100a, 100b, 102a and 102b of the first and second brackets 100 and 102.

The link device 120 further includes first and second links 122 and 124 mounted in a parallel relationship with each other for rotation about the first and second shafts 106 and 108. A pair of first and second guide slots 126a and 126b is formed in the vicinity of the front and rear ends of the first and second links 122 and 124. The shafts 64a and 74a of the first and second idle rollers 64 and 74 are vertically movably inserted into the first and second guide slots 126a and 126b of the first and second links 122 and 124. A spring 128 is attached at its opposite ends to the top corner portions of the first and second links 122 and 124. The spring 128 serves to resiliently bias the first and second links 122 and 124 into an initial position where the first and second feed rollers 62 and 72 makes contact with the first and second idle rollers 64 and 74.

Referring to FIGS. 2-6, 11, 12 and 16a-16e, a first image sensor 130 and a second image sensor 140 are respectively mounted on the top portion of the main frame 30 and the bottom portion of the pressing device 90 for scanning the opposite surfaces of the medium 2 to generate image data. The first image sensor 130 and the second image sensor 140 are disposed in a direction intersecting the medium loading direction. The initial gap G2 between the first image sensor 130 and the second image sensor 140 is selected to become smaller than the thickness T of the medium 2, while the width of the first and second image sensors 130 and 140 is selected to be greater than the width of the medium 2. The first image sensor 130 is exposed through the third aperture 16c of the case 10 and, similarly, the second image sensor 140 is exposed through the third aperture 94c of the inner pressing cover 92. Although FIGS. 2, 11, 12 and 16a-16e illustrate that the first image sensor 130 and the second image sensor 140 are out of alignment in a transverse direction, they may be disposed in exact alignment with each other, if desired. Examples of the first image sensor 130 and second image sensor 140 include a contact image sensor that can acquire high quality images of greater than 600 dpi.

Referring to FIGS. 2, 6, 10-12 and 16a-16e, a first medium sensor 150 and a second medium sensor 152 are mounted on the front and rear sides of the first roll feed 60. Each of the first medium sensor 150 and the second medium sensor 152 is comprised of a light emitting element 150a or 152a for emitting a light and a light receiving element 150b or 152b for receiving the light emitted from the light emitting element 150a or 152a to produce electric signals. The light emitting element 150a or 152a is mounted on a printed circuit board 154 which in turn attached to the top surface of the moving frame 40. The light receiving element 150b or 152b is mounted on the printed circuit board 38 set forth earlier. The light emitted by the light emitting element 150a or 152a reaches the light receiving element 150b or 152b after passing through the first and second sensor holes 98a and 98b of the inner pressing cover 92 and then the first and second sensor holes 18a and 18b of the case 10.

Figure 6:
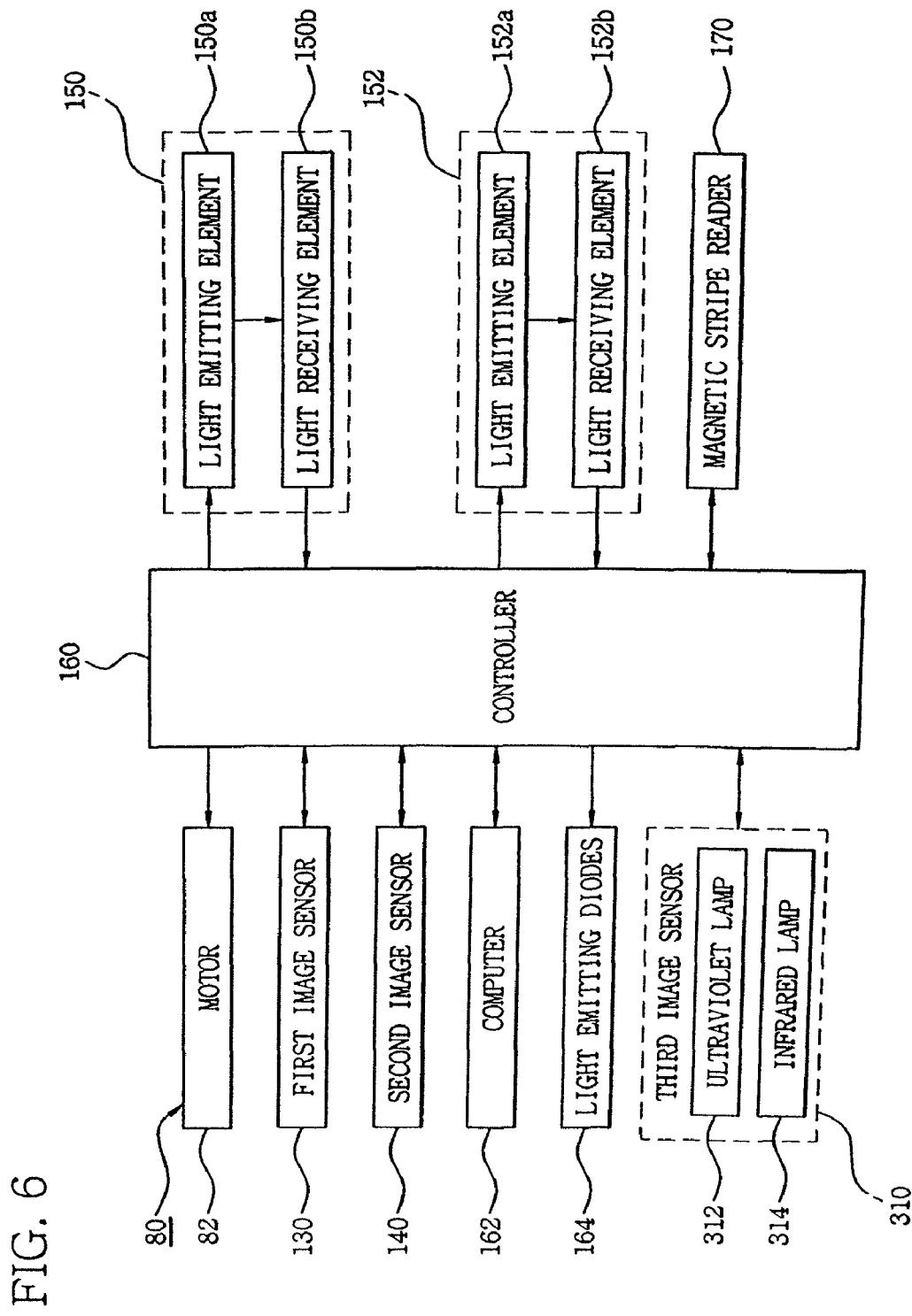
FIG. 6 is a block diagram showing a controller for controlling operation of a double side image scanner in accordance with the present invention.
Figure 7:
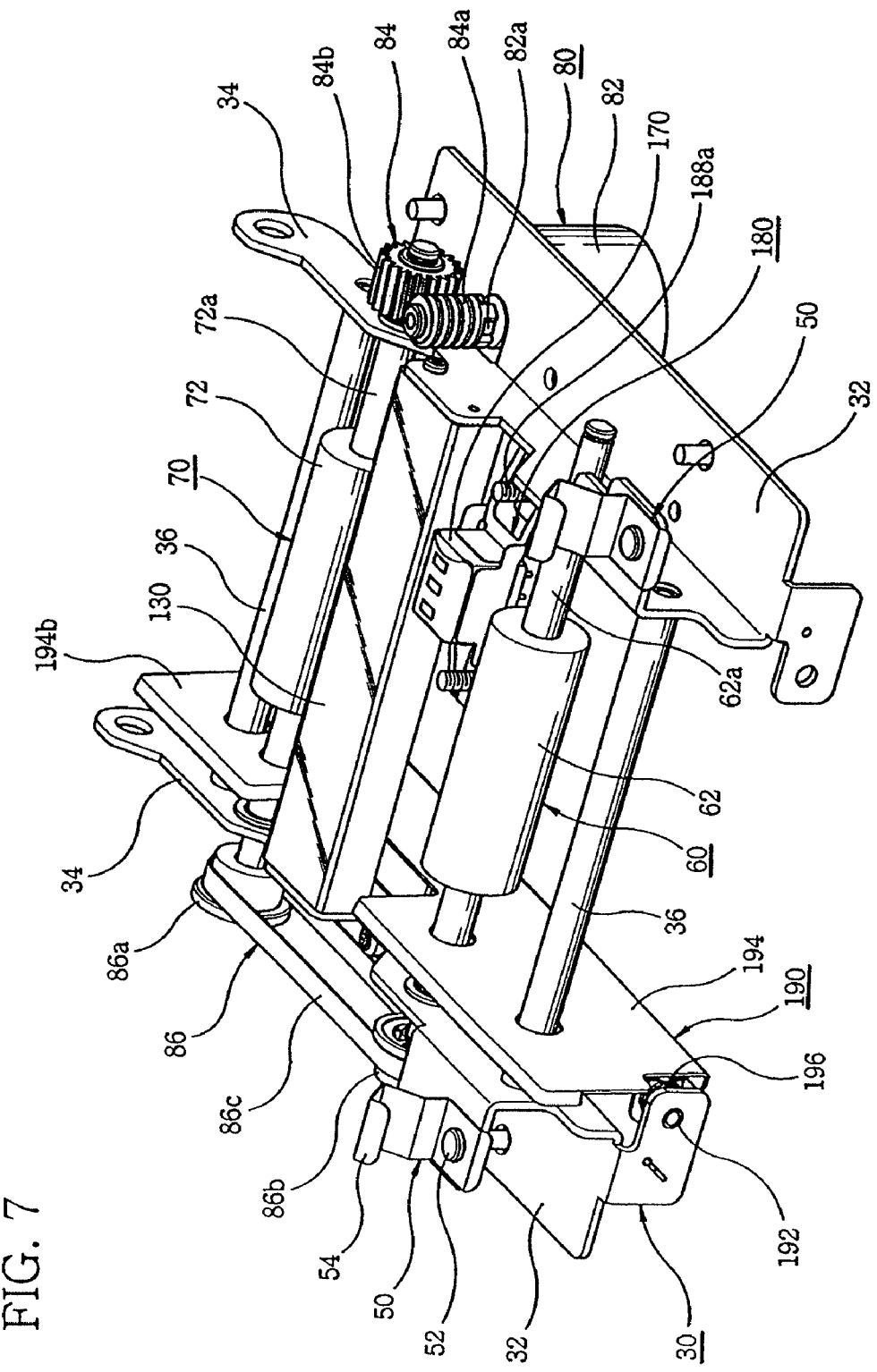
FIG. 7 is a perspective view illustrating the configuration of a main frame, a drive unit, a belt transmission mechanism and a tracking device employed in a double side image scanner in accordance with the present invention.
Figure 8:
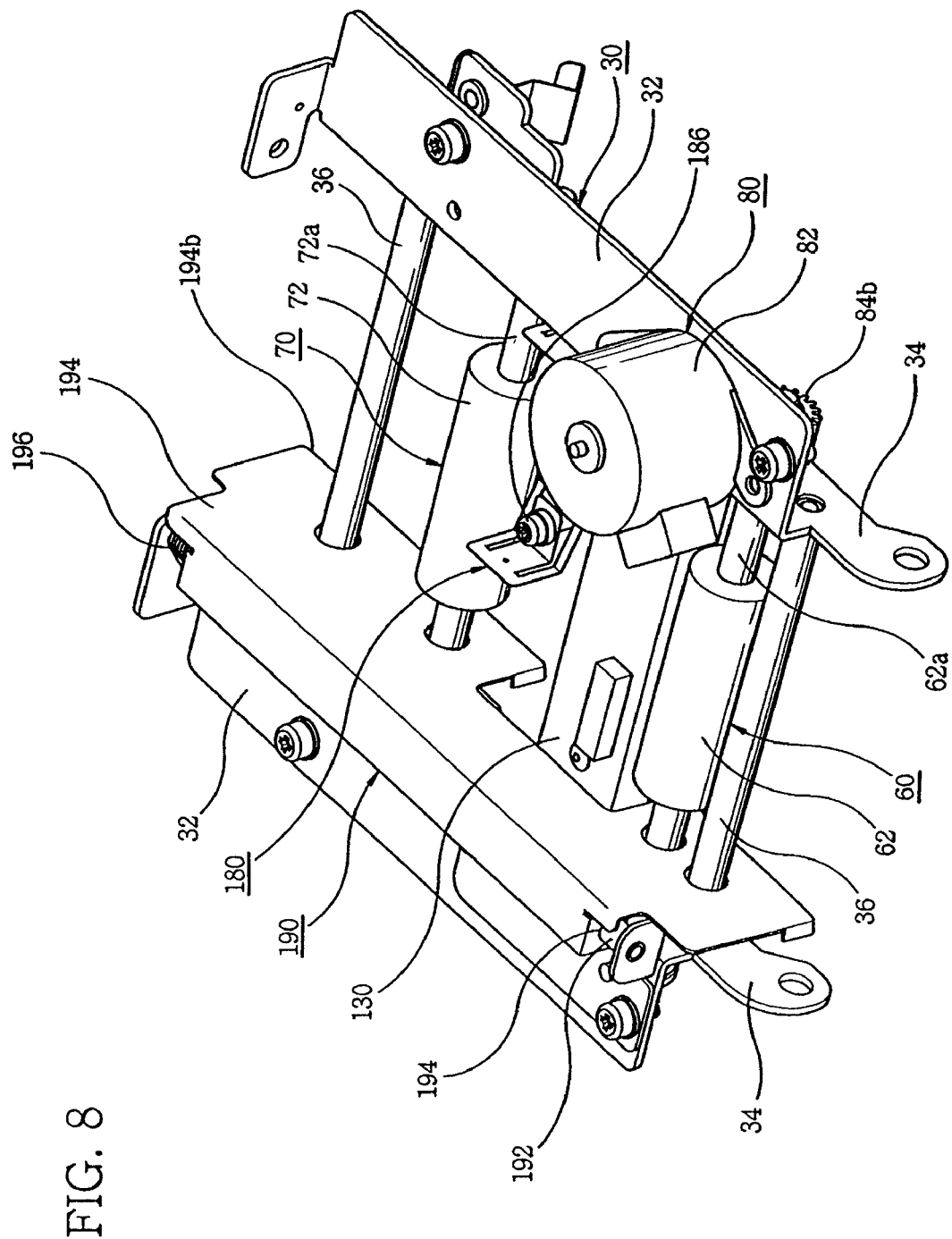
FIG. 8 is a perspective view invertedly illustrating the configuration of a main frame, a drive unit, a belt transmission mechanism and a tracking device employed in a double side image scanner in accordance with the present invention.
Figure 9:
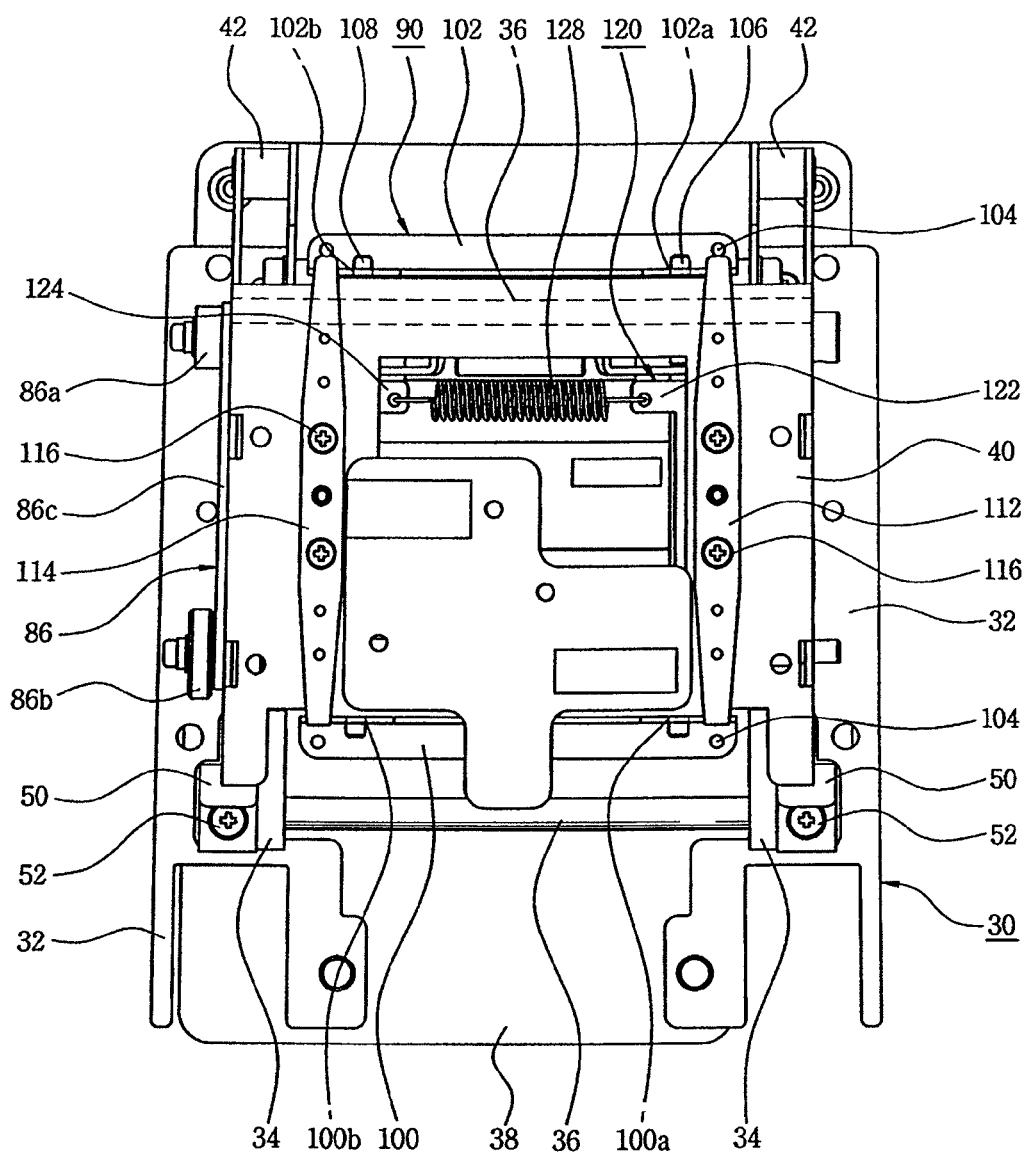
FIG. 9 is a top view showing the configuration of a main frame, a moving frame and a pressing device employed in a double side image scanner in accordance with the present invention.
Figure 10:
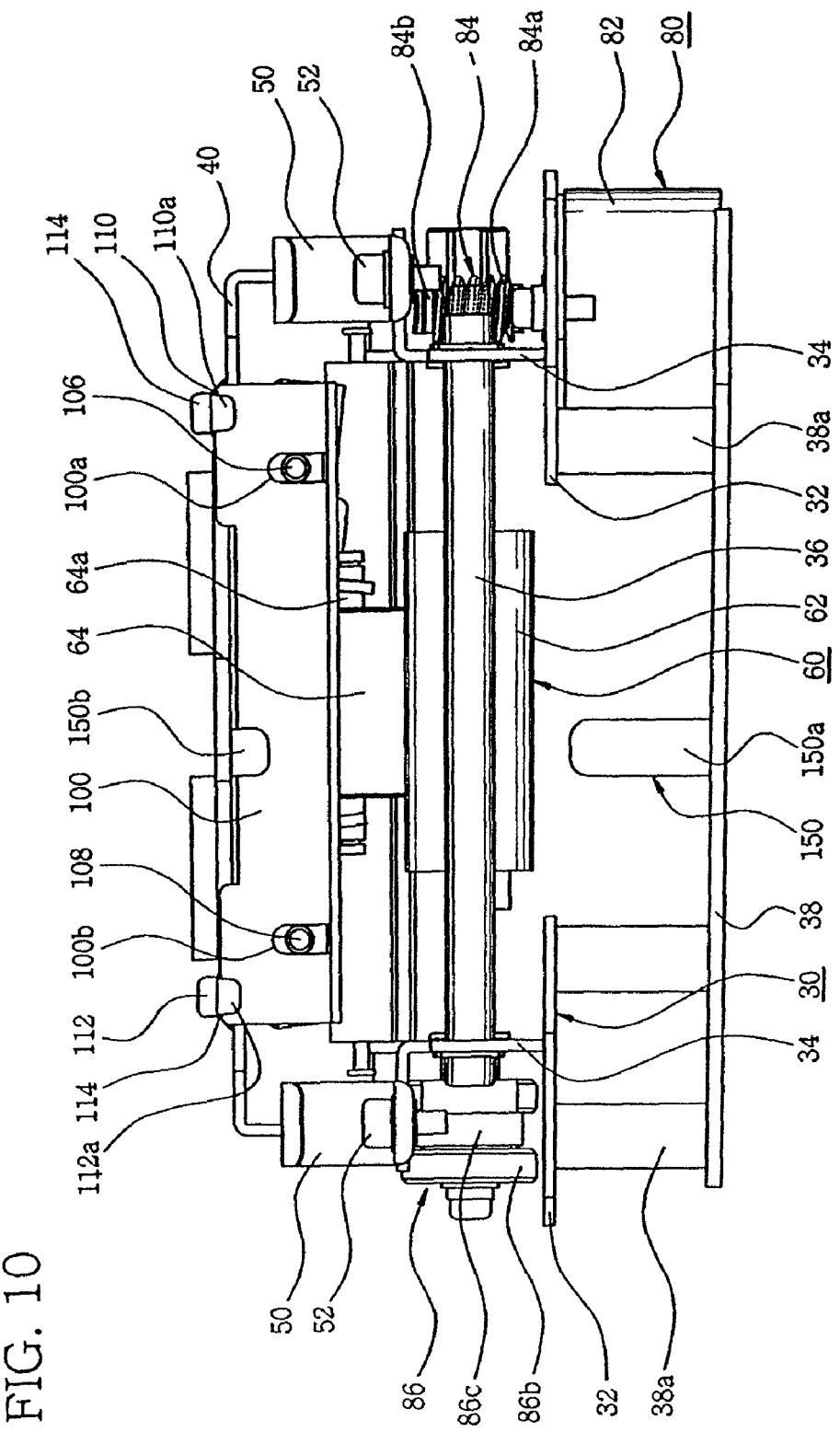
FIG. 10 is a front elevational view showing the configuration of a main frame, a moving frame and a pressing device employed in a double side image scanner in accordance with the present invention, with an inner pressing cover removed.

Referring to FIGS. 6 and 10-12, the double side image scanner of the present invention further includes a controller 160 for controlling operations of the motor 82, the first and second image sensors 130 and 140, and the first and second medium sensors 150 and 152. The controller 160 is mounted on the printed circuit board 38 and serves to control the operations of the motor 82 and the first and second image sensors 130 and 140, in response to the signals supplied from the light receiving elements 150b and 152b of the first and second medium sensors 150 and 152. The controller 160 is interfaced with a computer 162 for transmitting the image data inputted from the first and second image sensors 130 and 140 to the computer 162. As depicted in FIGS. 1 and 6, a group of light emitting diodes 164 are provided on the top surface of the case 10 and controlled by the controller 160 to display the operative condition of the double side image scanner.

Referring to FIGS. 2, 3, 4, 6-8, 11, 12, 15 and 16a-16e, the double side image scanner of the present invention further includes a magnetic stripe reader 170 that serves to read out the data stored in the magnetic stripe 4 of the medium 2 and then input the data into the controller 160. The magnetic stripe reader 170 is exposed to the guide track 12 through the fifth aperture 16e of the case 10 and supported on the center of a resilient holder 180.

Figure 15:
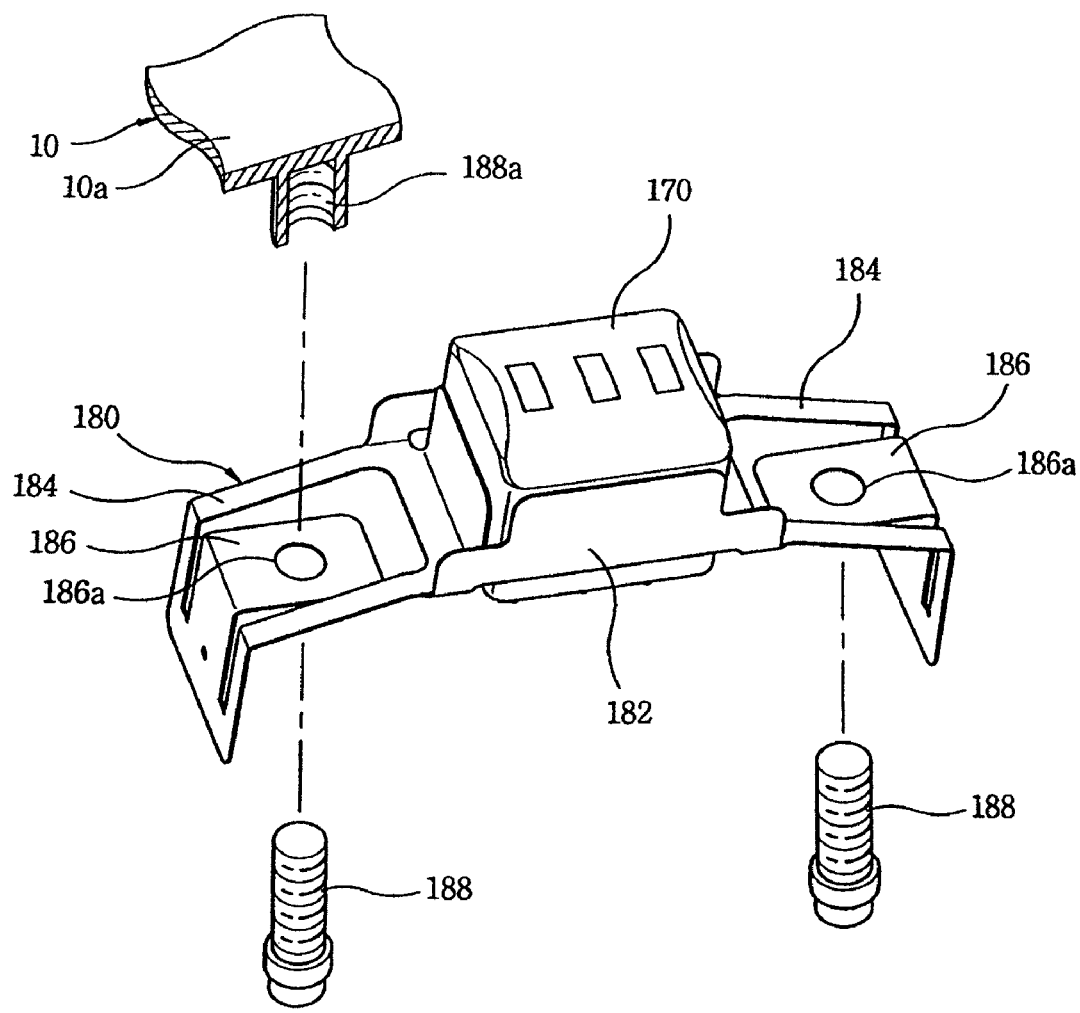
FIG. 15 is a perspective view showing the configuration of a magnetic stripe reader and a holder employed in a double side image scanner in accordance with the present invention.

As specifically illustrated in FIG. 15, the holder 180 has a body 182 for accommodating the magnetic stripe reader 170 and a pair of elastic bridges 184 downwardly bent from the lateral sides of the body 182. Each of the elastic bridges 184 is provided with a securing piece 186 whose side and top edge portions are severed from the corresponding elastic bridge 184. The securing piece 186 has a center hole 186a through which a screw 188 is inserted and fastened to a boss 188a protruding from the underside of the top half part 10a of the case 10.

Referring to FIGS. 1, 3-5, 7 and 8, the double side image scanner of the present invention further includes a tracking device 190 provided on one side of the main frame 30. The tracking device 190 serves to urge the medium 2 from the first side wall 14a toward the second side wall 14b so that the magnetic stripe reader 170 can accurately track the magnetic stripe 4 of the medium 2 when the medium 2 is loaded along a reference loading line L of the guide track 12. The tracking device 190 is comprised of a pair of pivots 192, a side push plate 194 and a spring 196.

Figure 4:
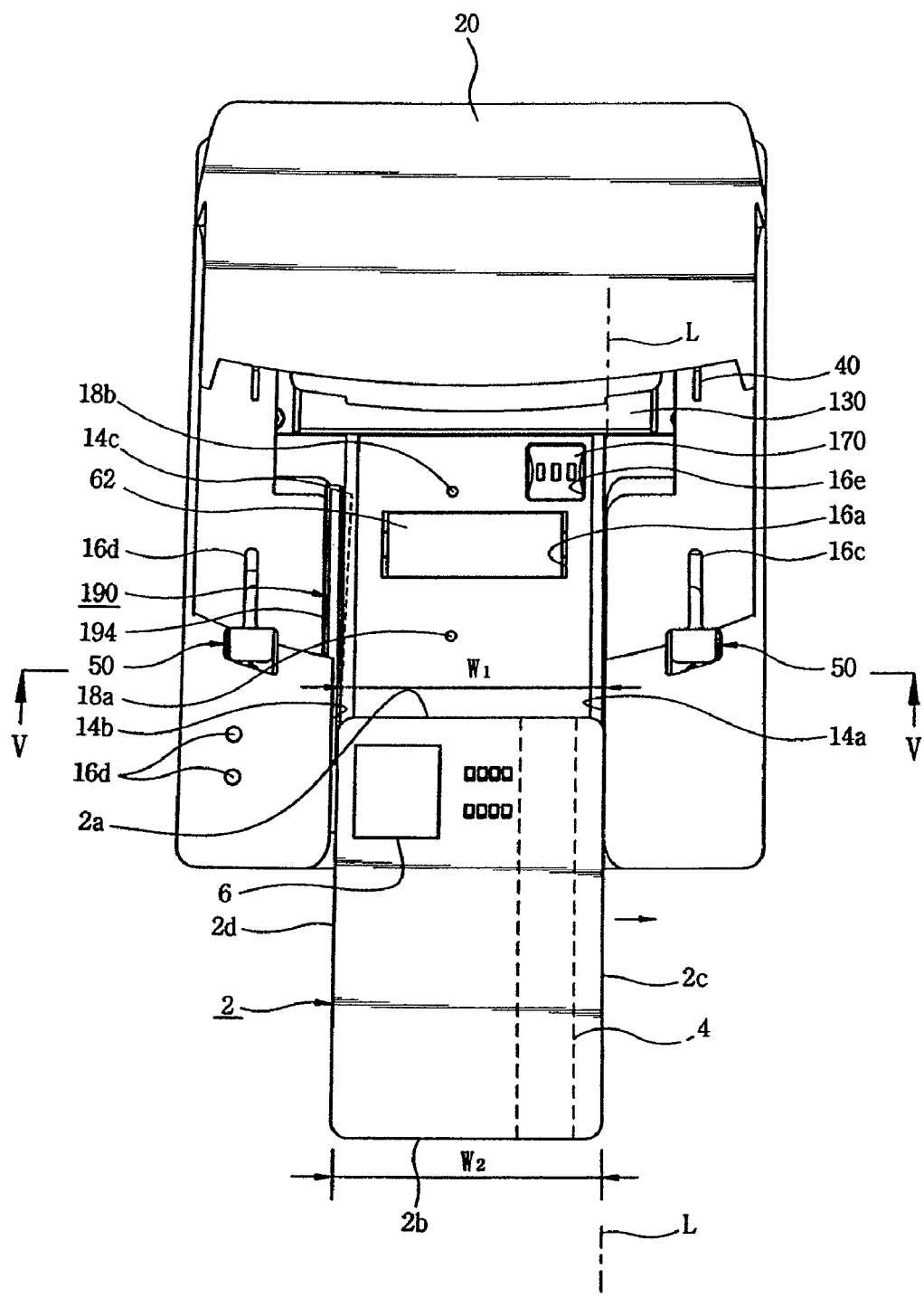
FIG. 4 is a top view depicting a double side image scanner in accordance with the present invention, with its cover opened.
Figure 5:
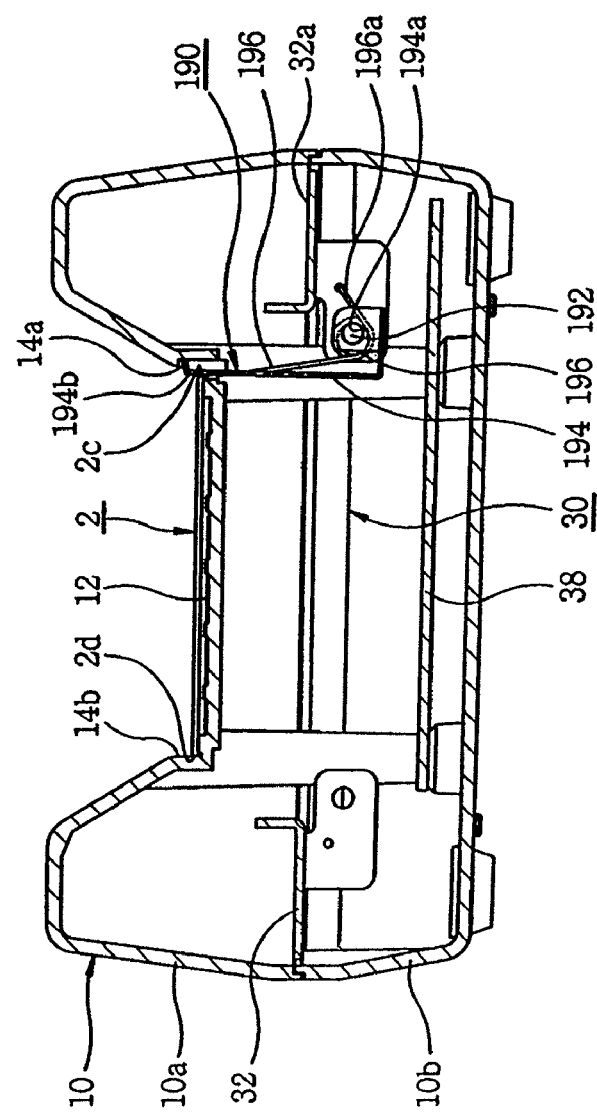
FIG. 5 is a cross-sectional view taken along line V-V in FIG. 4.

The pivots 192 are mounted on the side panels 34 in a mutually aligned relationship. Axis holes 194a are formed at the bottom lateral sides of the side push plate 194 to receive the pivots 192 in a rotatable manner. The side push plate 194 has a top pushing portion 194b that extends through the slot 14c of the case 10 to make contact with and push the second flank end 2d of the medium 2. As shown in FIG. 4, at the time when the side push plate 194 is in an initial position where the medium 2 remains out of contact with the pushing portion 194b of the side push plate 194, the gap W1 between the first side wall 14a and the pushing portion 194b is kept smaller than the width W2 of the medium 2. The spring 196 is comprised of a torsion spring coupled to the pivots 192 for resiliently biasing the pushing portion 194b of the side push plate 194 to push the second flank end 2d of the medium 2. As illustrated in FIG. 5, one end 196a of the spring 196 is secured to the side panel 34 and the other end 196b thereof is supported on the rear surface of the side push plate 194. Alternatively, the spring 196 may be comprised of a compression coil spring or a tension coil spring that can resiliently bias the pushing portion 194b of the side push plate 194 in such a manner as to push the second flank end 2d of the medium 2.

Figure 17:
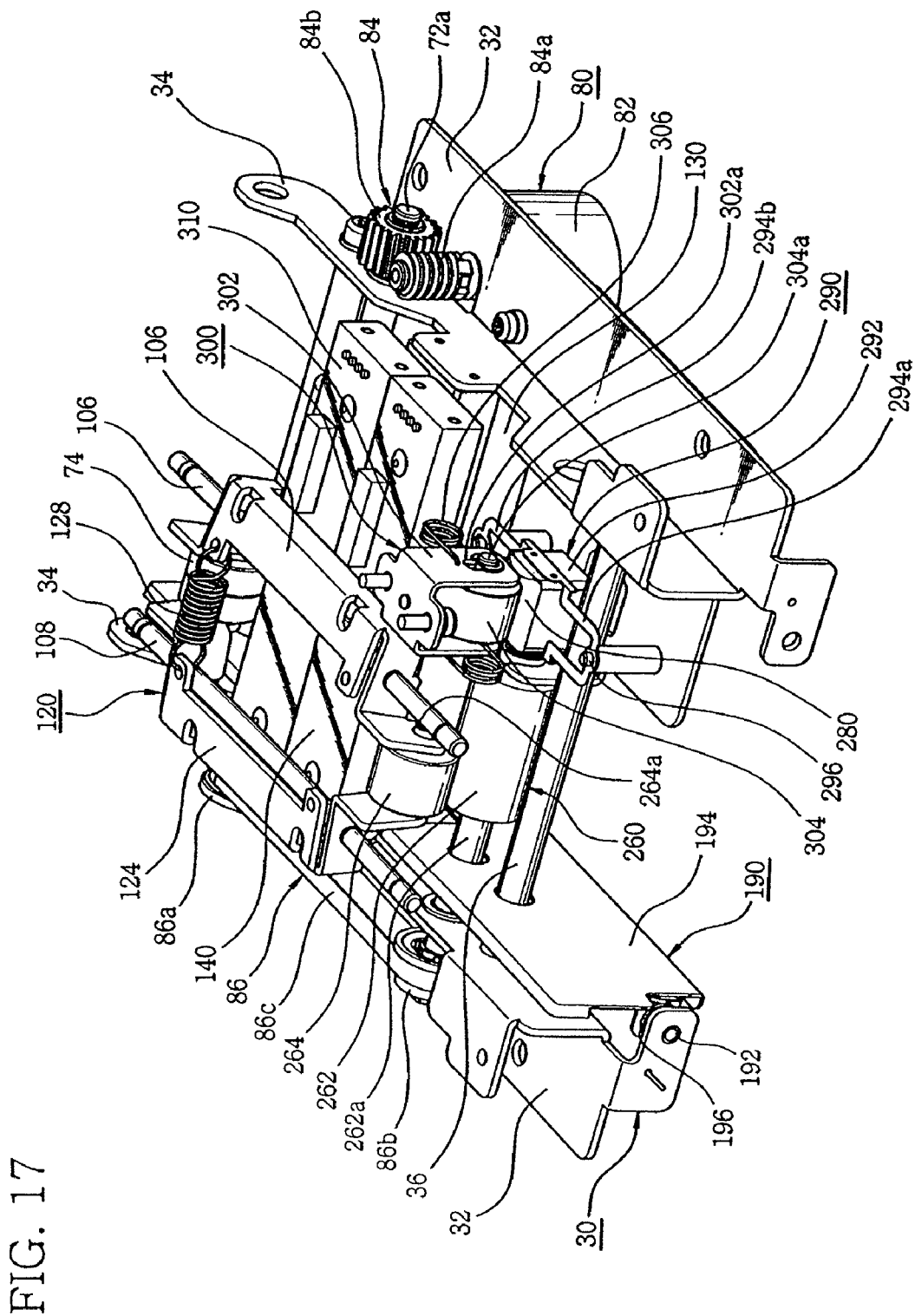
FIG. 17 is a perspective view showing the positional relationship of a magnetic stripe reader and a third image sensor in a double side image scanner in accordance with another embodiment of the present invention.
Figure 18:
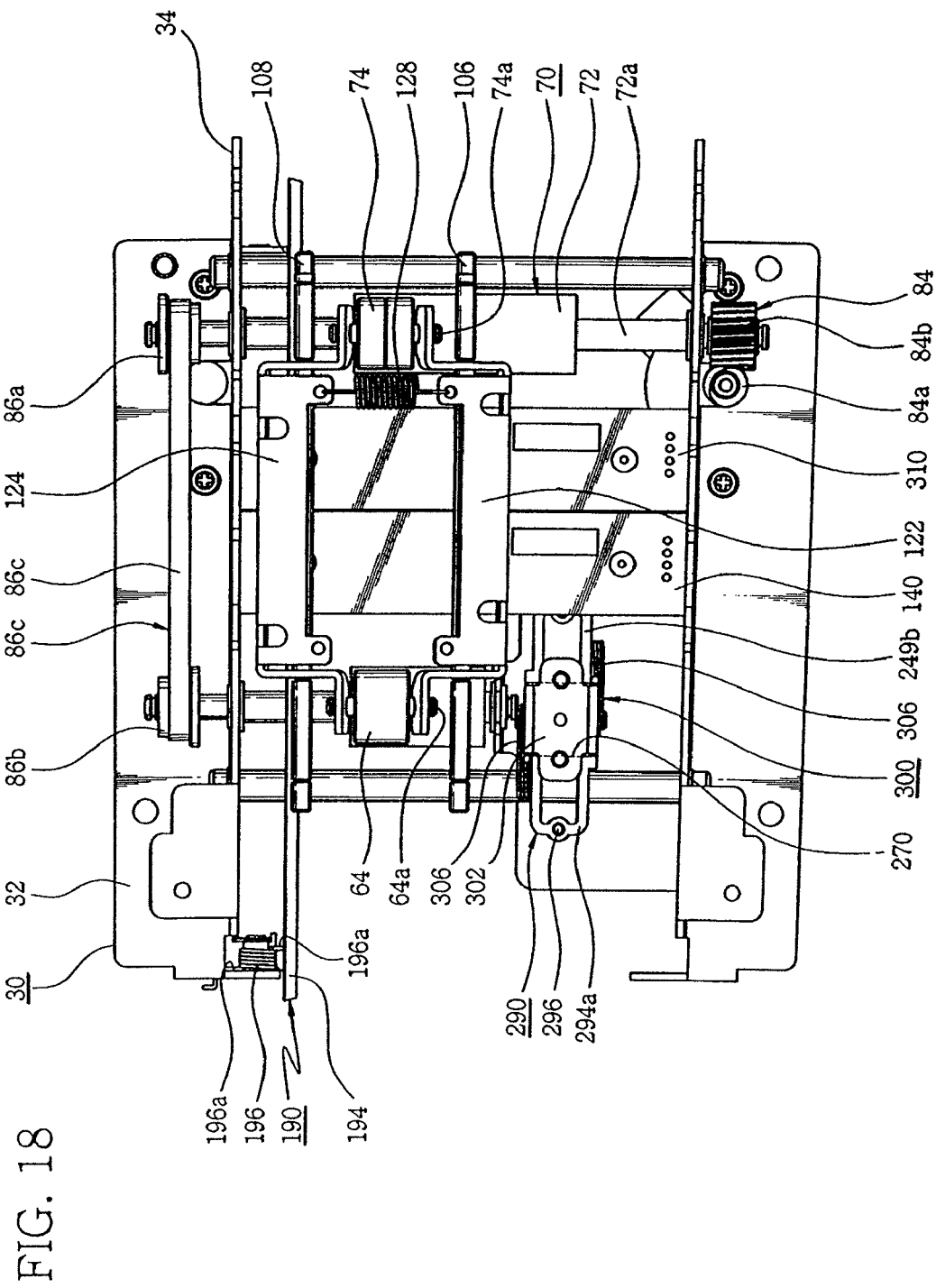
FIG. 18 is a top view showing the positional relationship of a magnetic stripe reader and a third image sensor in a double side image scanner in accordance with another embodiment of the present invention.

FIGS. 17 and 18 illustrate a double side image scanner in accordance with another embodiment of the present invention. As illustrated, the double side image scanner of this embodiment includes first and second roll feeds 260 and 270 respectively mounted on the front and rear sides of the main frame 30 for loading and unloading the medium 2. The first and second roll feeds 260 and 270 includes first and second feed rollers 262 and 272 mounted for rotation about shafts 262a and 272a and first and second idle rollers 264 and 274 disposed above the first and second feed rollers 262 and 272 for rotation about shafts 264a and 274a. The first and second idle rollers 264 and 274 are vertically movable with respect to the first and second feed rollers 262 and 272. The double side image scanner of this embodiment is the same as that of the preceding embodiment in terms of the configuration and operation of the main frame 30, the drive device 80, the first and second image sensors 130 and 140, and the tracking device 190. Accordingly, the main frame 30, the drive device 80, the first and second image sensors 130 and 140, and the tracking device 190 are designated by the same reference numerals as used in the preceding embodiment and will not be described in detail.

The double side image scanner of this embodiment further includes a magnetic stripe reader 280 mounted in front of the first roll feed 60. The magnetic stripe reader 280 is supported on the center of a resilient holder 290. The holder 290 has a body 292 for accommodating the magnetic stripe reader 280 and a pair of elastic bridges 294a and 294b protruding from the lateral sides of the body 292. The elastic bridges 294a and 294b are fastened to the top surface of one of the base plates 32 by means of a screw 296.

A pinch roller assembly 300 is provided above the magnetic stripe reader 280. The pinch roller assembly 300 is comprised of a bracket 302, a pinch roller 302 and a pair of torsion springs 306. The bracket 302 has a pair of guide slots 302a extending in a vertical direction. Screws 302b are used to fixedly secure the bracket 302 to the cover 20 or the inner pressing cover 92 of the pressing device 90 described above. The pinch roller 304 is provided with a shaft 304a rotatably inserted into the guide slots 302a of the bracket 302. The torsion springs 306 are secured at their one ends to the bracket 302 and supported at the other ends by the opposite ends of the shaft 304a so that they can resiliently bias the pinch roller 304 into contact with the magnetic stripe reader 280. It should be appreciated that the pinch roller assembly 300 may be employed in the magnetic stripe reader 170 of the preceding embodiment.

Referring to FIGS. 6, 17 and 18, the double side image scanner of this embodiment further includes a third image sensor 310 disposed in proximity with the rear side of the second image sensor 140. Alternatively, the third image sensor 310 may be provided at the front or rear side of the first image sensor 130 or in front of the second image sensor 140. As shown in FIG. 6, the third image sensor 310 includes, as its light source, an ultraviolet lamp 312 for irradiating ultraviolet rays. The ultraviolet rays irradiated by the ultraviolet lamp 312 helps to make conspicuous the forgery-proof element 6 marked on the medium 2 with fluorescent ink, thus assuring accurate scanning of the images of the forgery-proof element 6. If desired, the ultraviolet lamp 312 may be replaced with an infrared lamp 314 for irradiating infrared rays. The infrared rays of the infrared lamp 314 helps to make conspicuous the infrared ray sensitive codes of the forgery-proof element 6 marked on the medium 2, thus assuring accurate scanning of the images of the forgery-proof element 6. The ultraviolet lamp 312 and the infrared lamp 314 may be all employed in the third image sensor 312 and also be used in the first image sensor 130 and the second image sensor 140.

Now, description will be given to the actuation and operation of the double side image scanner in accordance with the present invention.

Referring to FIGS. 1, 2, 5, 6, 16a and 16b, if the user pushes the medium 2 into the guide track 12 of the case 10 in a condition that the magnetic stripe 4 of the medium 2 faces the guide track 12, the front end 2a of the medium 2 makes contact with the pushing portion 194b of the side push plate 194 as the medium 2 moves forward along the guide track 12. Under the action of the pushing force applied by the user, the side push plate 194 is rotated about the pivot 192 against the resilient force of the spring 196, thus allowing the medium 2 to advance in a facilitated manner. As the medium 2 continues to move forward, the second flank end 2d of the medium 2 comes into contact with the pushing portion 194b of the side push plate 194. At this moment, the second flank end 2d of the medium 2 is pushed by the pushing portion 194b of the side push plate 194 which has a tendency to rotate about the pivot 192 into the initial position under the biasing force of the spring 196. This will cause the medium 2 to be displaced toward the first side wall 14a, eventually bringing the first flank end 2c of the medium 2 into contact with the first side wall 14a. Thus, as illustrated in FIG. 4, the medium 2 is loaded along the guide track 12 by taking the first side wall 14a as the reference loading line L.

Thank to the fact that the side push plate 194 acts to allow the medium 2 to be rectilinearly and accurately loaded in close contact with the first side wall 14a, it becomes possible to compensate the variation in loading speed and frictional force caused by the size deviation of the medium 2, the errors in roundness and straightness of the first and second feed rollers 62 and 72 and the first and second idle rollers 64 and 74, and other parameters. This makes accurate, smooth and constant-speed loading operation come true. Furthermore, such rectilinear movement of the medium 2 effectively prevents any distortion of the images acquired by the first image sensor 130 and second image sensor 140.

The front end 2a of medium 2 makes contact with the inner pressing cover 92 for the reason that the initial gap G1 between the guide track 12 of the case 10 and the underside of the inner pressing cover 92 is maintained smaller than the thickness T of the medium 2. The inner pressing cover 92 is raised up against the biasing force of the first and second leaf springs 110 and 112 by the user's pushing force applied to the medium 2, thus facilitating the entry of the medium into the double side image scanner. At this time, the first and second shafts 106 and 108 move vertically upwardly along the first and second guide slots 100a, 100b, 102a and 102b of the first and second brackets 100 and 102, thereby allowing the inner pressing cover 92 to make rectilinear upward movement. The inner pressing cover 92 applies a pressing force on the top surface of the medium 2 under the action of the biasing force of the first and second leaf springs 110 and 112. The pressing actuation of the inner pressing cover 92 can make planar the medium 2 flat and planar even if the latter has been subjected to flexural deformation. Making the flexurally deformed medium 2 planar in this manner helps to minimize distortion of the images acquired from the medium 2.

Subsequently, if the front end 2a of the medium 2 passes through between the light emitting element 150a and the light receiving element 150b of the first medium sensor 150, the light emitted by the light emitting element 150a is interrupted and cannot reach the light receiving element 150b. In response, the light receiving element 150b generates and supplies an off-condition signal to the controller 160 which in turn actuates the motor 82 of the drive device 80 clockwise. Upon the clockwise rotation of the motor 82, the rotational force thereof is transferred to the second feed roller 72 through the worm 84a and the worm wheel 84b of the gear arrangement 84 and then transmitted to the first feed roller 62 via the driving pulley 86a, the belt 86c and the driven pulley 86b of the belt transmission mechanism 86. This will cause the first feed roller 62 and the second feed roller 72 to rotate clockwise together in preparation for the subsequent loading operation.

Figure 16C:
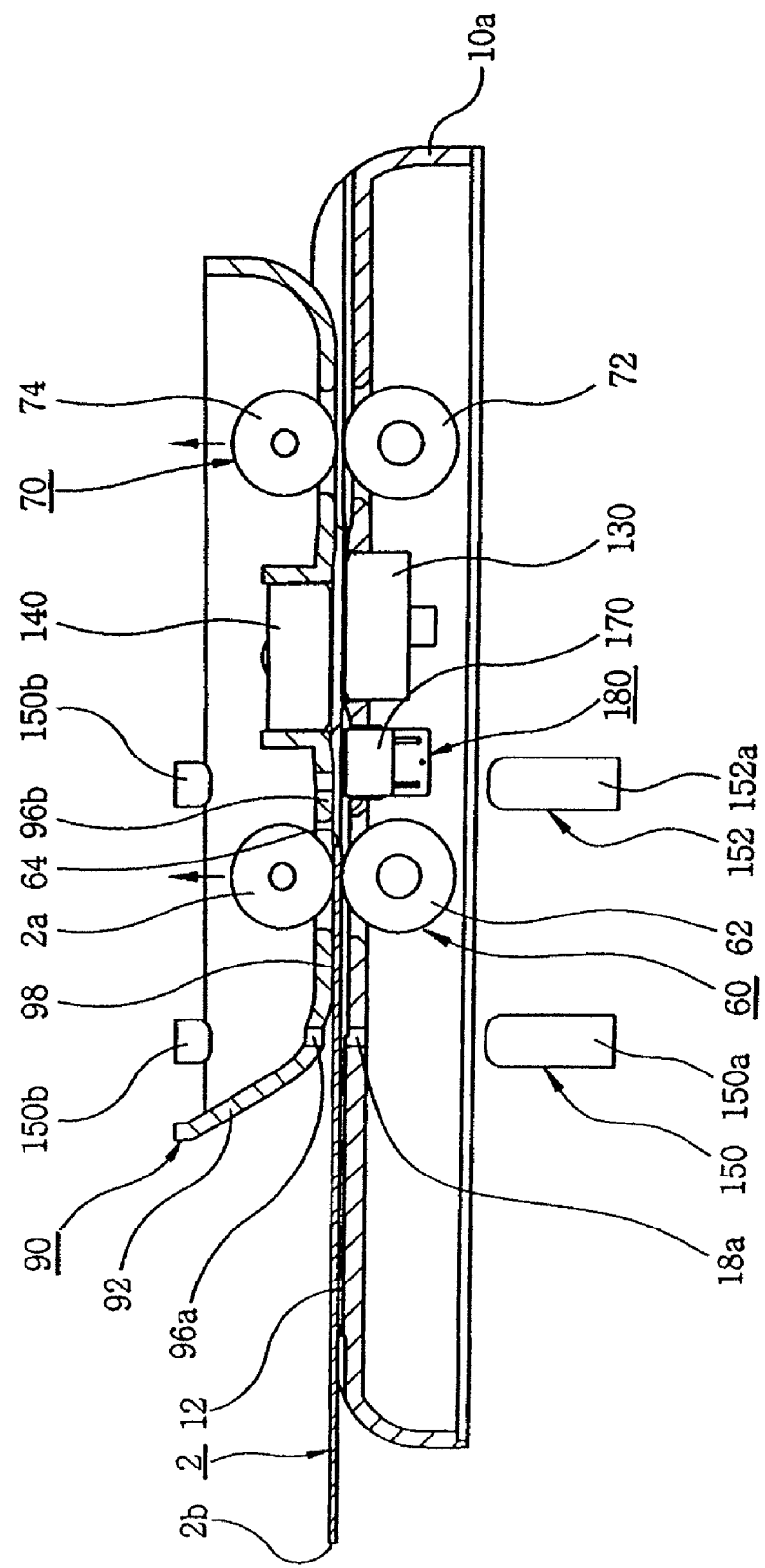

Referring to FIGS. 2, 6 and 16c, if the front end 2a of the medium 2 enters between the first feed roller 62 and the first idle roller 64 of the first roll feed 60, the first idle roller 64 is raised up by the pushing force of the medium 2, thus allowing the medium 2 to further advance. At this time, the shaft 64a of the first idle roller 64 moves vertically upwardly along the first guide slots 126a of the first and second links 122 and 124, which ensures that the first idle roller 64 makes rectilinear upward movement. If the shaft 64a of the first idle roller 64 reaches the top end of the first guide slot 126a, the first and second links 122 and 124 are rotated about the first and second shafts 106 and 108 under the action of the first idle roller 64. Responsive to the rotation of the first and second links 122 and 124, the second idle roller 74 is also raised up together with the first idle roller 64.

In the meantime, the spring 128 resiliently biases the first and second links 122 and 124 into their initial position, as a result of which the first idle roller 64 presses the medium 2 against the first feed roller 62. The first feed roller 62 rotating clockwise by the motor 82 cooperates with the first idle roller 64 to load the medium 2 along the loading track 98 at a constant speed.

Figure 16D:
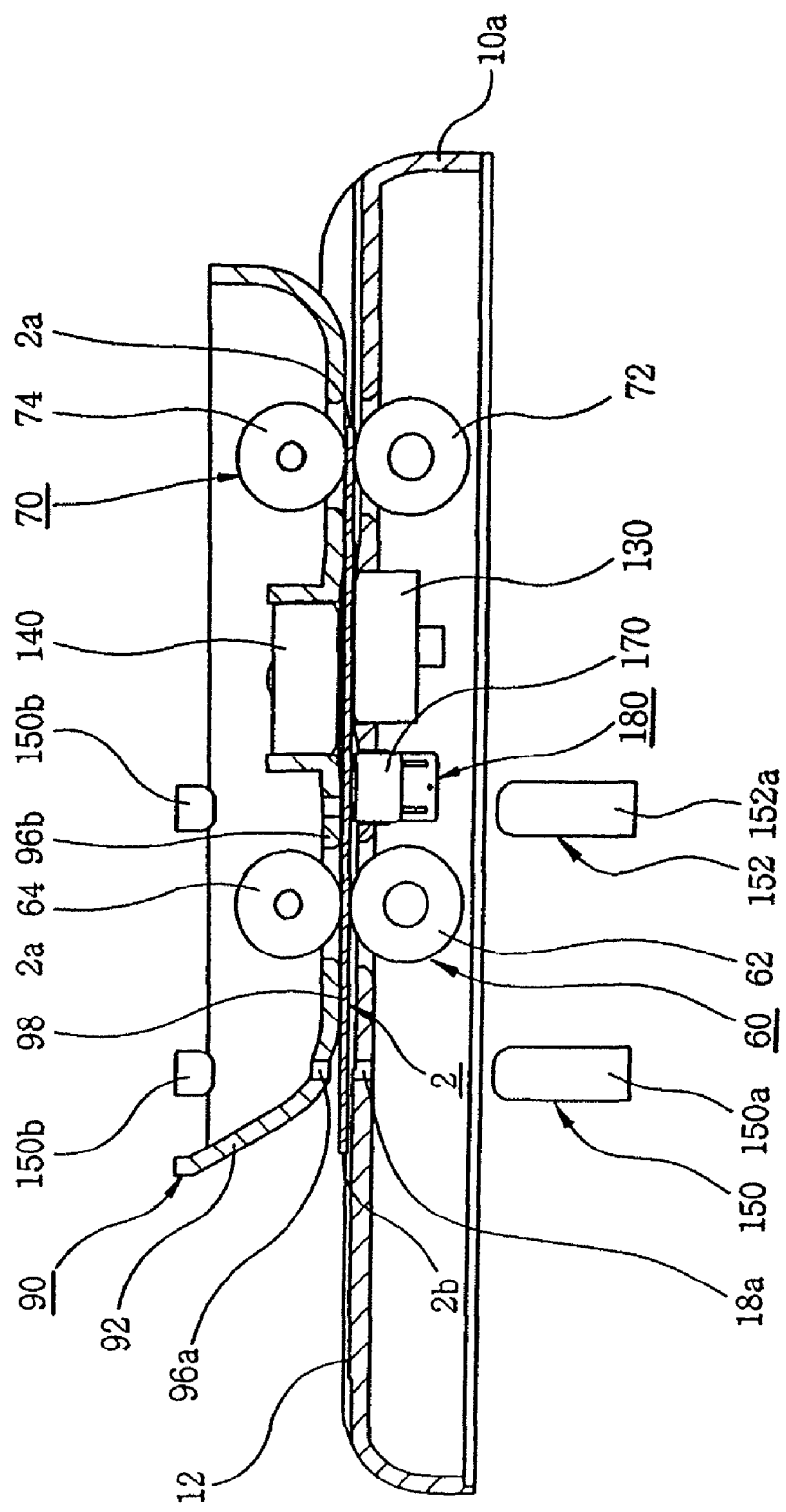

Referring to FIGS. 2, 6 and 16d, if the front end 2a of the medium 2 is moved between the first feed roller 62 and the first idle roller 64 of the first roll feed 60 and then between the light emitting element 152a and the light receiving element 152b of the second medium sensor 152, the light of the light emitting element 152a is interrupted by the medium 2 and therefore fails to reach the light receiving element 152b. In response, the light receiving element 152b generates and supplies an off-condition signal to the controller 160 which in turn actuates the first image sensor 130, the second image sensor 140 and the magnetic stripe reader 170.

Referring to FIGS. 4, 7, 15 and 16d, as the medium 2 is loaded along the loading track 98 by the pushing force of the side push plate 194, the magnetic stripe 4 of the medium 2 is accurately tracked by the magnetic stripe reader 170 which in turn reads out the data stored in the magnetic stripe 4 and inputs the same into the controller 160.

If the magnetic stripe reader 170 is brought into contact with the medium 2 and receives a load, the elastic bridges 184a and 184b of the holder 180 are elastically deformed to absorb the load imparted to the magnetic stripe reader 170, thus ensuring that the magnetic stripe reader 170 makes contact with the magnetic stripe 4 in an accurate and stable manner. This prevents any slipping, scratching and jamming of the medium 2, while avoiding any spacing loss otherwise generated between the magnetic stripe 4 and the magnetic stripe reader 170. Accordingly, the magnetic stripe reader 170 can accurately read the data stored in the magnetic stripe 4.

As the medium 2 is loaded along the loading track 98, the first image sensor 130 and the second image sensor 140 scan the opposite surfaces of the medium 2 and input the image data thus acquired into the controller 160 which in turn transmits the image data to the computer 162.

Subsequently, the front end 2a of the medium 2 moves through between the second feed roller 72 and the second idle roller 74 of the second roll feed 70, at which time the second idle roller 74 is pushed upwardly by the medium 2 and allows the medium 2 to move forward. In this process, the shaft 74a of the second idle roller 74 is moved vertically upwardly along the second guide slots 126b of the first and second links 122 and 124 so that the second idle roller 74 can make rectilinear upward movement.

As illustrated in FIG. 16a, in the case of the diameter R1 of the first feed roller 62 being the same as the diameter R2 of the second feed roller 72, there is a possibility that, if the front end 2a of the medium 2 is bent downwardly or if the first feed roller 62 made of a soft material is excessively compressed by the contact with the medium 2, the front end 2a of the medium 2 may be derailed from the loading track 98 after passing the first feed roller 62 and then may collide with the second feed roller 72, thus causing a loading error. According to the double side image scanner of the present invention, the diameter R1 of the first feed roller 62 is greater than the diameter R2 of the second feed roller 72. Such difference in diameters R1 and R2 prevents any occurrence of the afore-mentioned loading error even when the medium 2 is flexurally deformed or when the first feed roller 62 is excessively compressed. This ensures that the rectilinear constant-speed loading operation is performed in an accurate and smooth fashion.

Figure 16E:
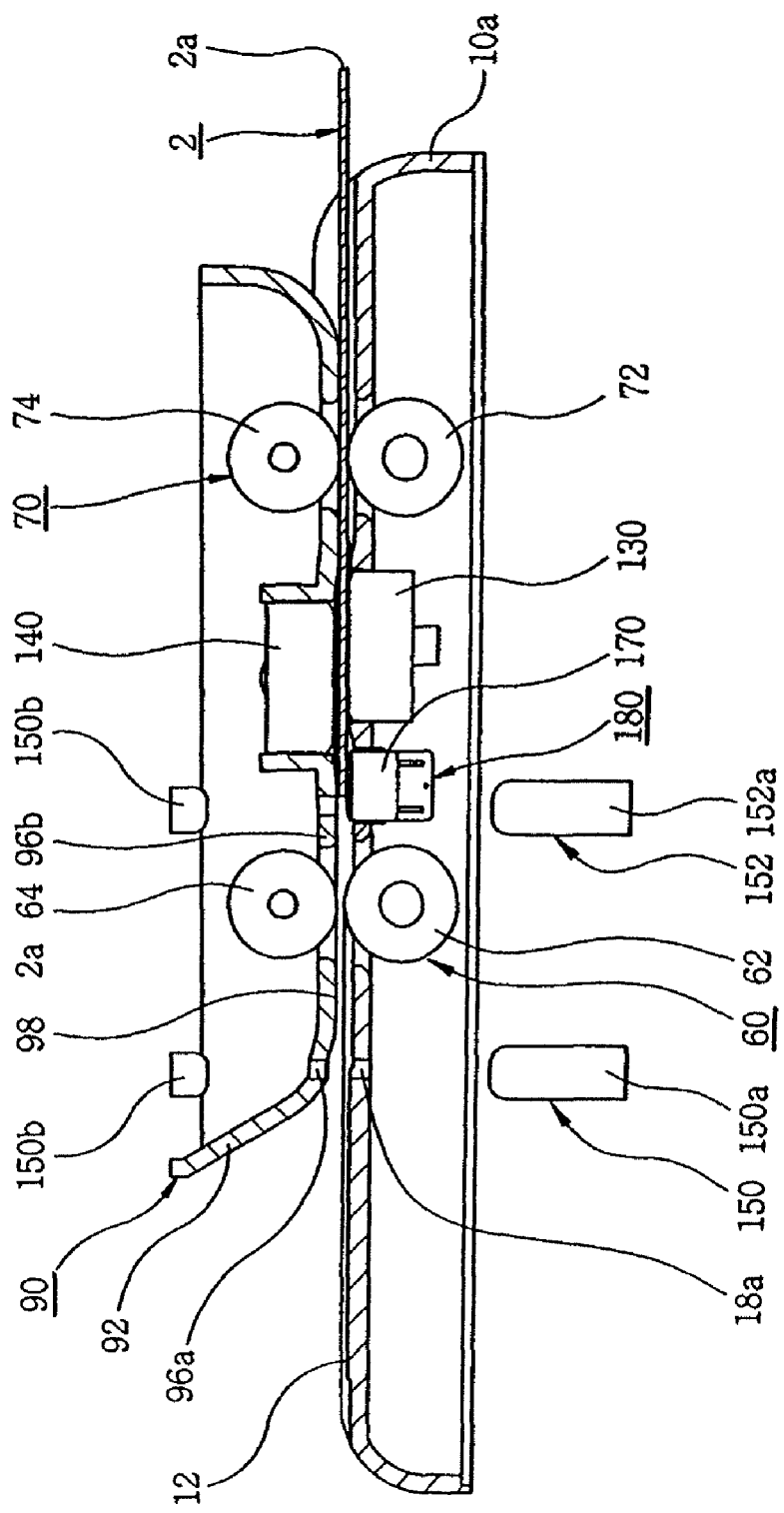

Referring to FIGS. 6 and 16e, if the rear end 2b of the medium 2 passes through between the light emitting element 152a and the light receiving element 152b of the second medium sensor 152, the light emitted from the light emitting element 152a is received by the light receiving element 152b, in response to which the light receiving element 152b issues and supplies an on-condition signal to the controller 160 which in turn stops the operation of the first image sensor 130 and the second image sensor 140 and causes the motor 82 to rotate counterclockwise. Upon the clockwise rotation of the motor 82, the rotational force thereof is transferred to the second feed roller 72 through the worm 84a and the worm wheel 84b of the gear arrangement 84 and then transmitted to the first feed roller 62 via the driving pulley 86a, the belt 86c and the driven pulley 86b of the belt transmission mechanism 86. Thus, the first feed roller 62 and the second feed roller 72 are rotated counterclockwise and cooperate with the first and second idle rollers 64 and 74 to unload the medium 2 along the loading track 98.

Subsequently, if the rear end 2b of the medium 2 passes through between the light emitting element 150a and the light receiving element 150b of the first medium sensor 150 in the medium unloading process, the light emitted from the light emitting element 150a is received by the light receiving element 150b, in response to which the light receiving element 150b issues and supplies an on-condition signal to the controller 160 which in turn stops the actuation of the motor 82. At the time when the motor 82 ceases to rotate, the rear end 2b of the medium 2 protrudes to the outside in the guide track 12 and the front end 2a of the medium 2 is kept pressed by means of the inner pressing cover 92.

Finally, if the user grasps the rear end 2b of the medium 2 and then completely removes the medium 2 from the guide track 12 of the case 10, the inner pressing cover 92 is moved vertically downwardly into the initial position under the biasing action of the first and second leaf springs 110 and 112. Concurrently, the first and second links 122 and 124 are rotated about the first and second shafts 106 and 108 into the initial position by the biasing force of the spring 128, whereby the first and second idle rollers 64 and 74 of the first and second roll feeds 60 and 70 are brought into contact with the first feed roller 62 and the second feed roller 72, respectively.

Figure 11:
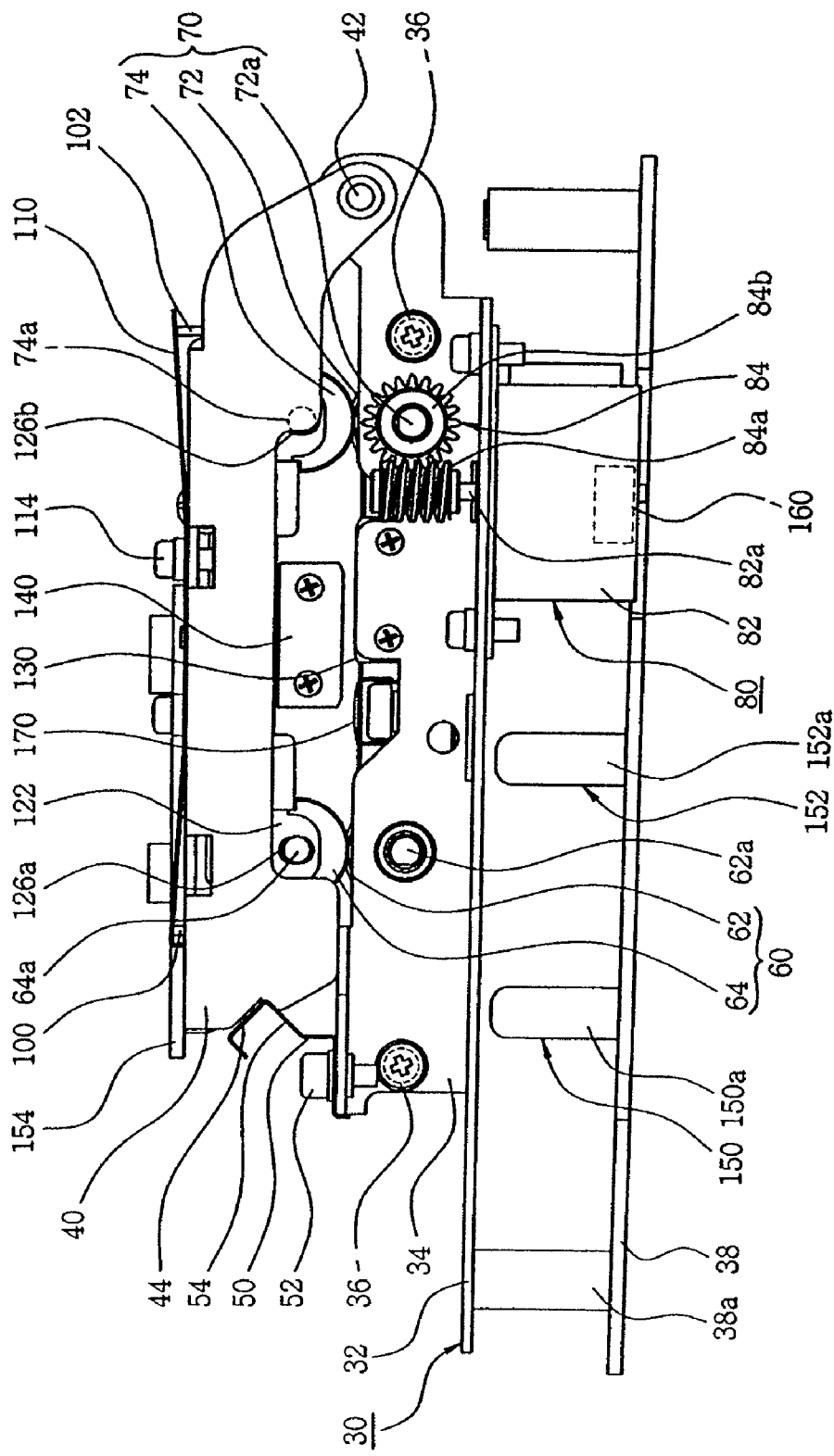
FIG. 11 is a left side elevational view showing the configuration of a main frame, a moving frame, a drive unit and a pressing device employed in a double side image scanner in accordance with the present invention, with an inner pressing cover removed.
Figure 12:
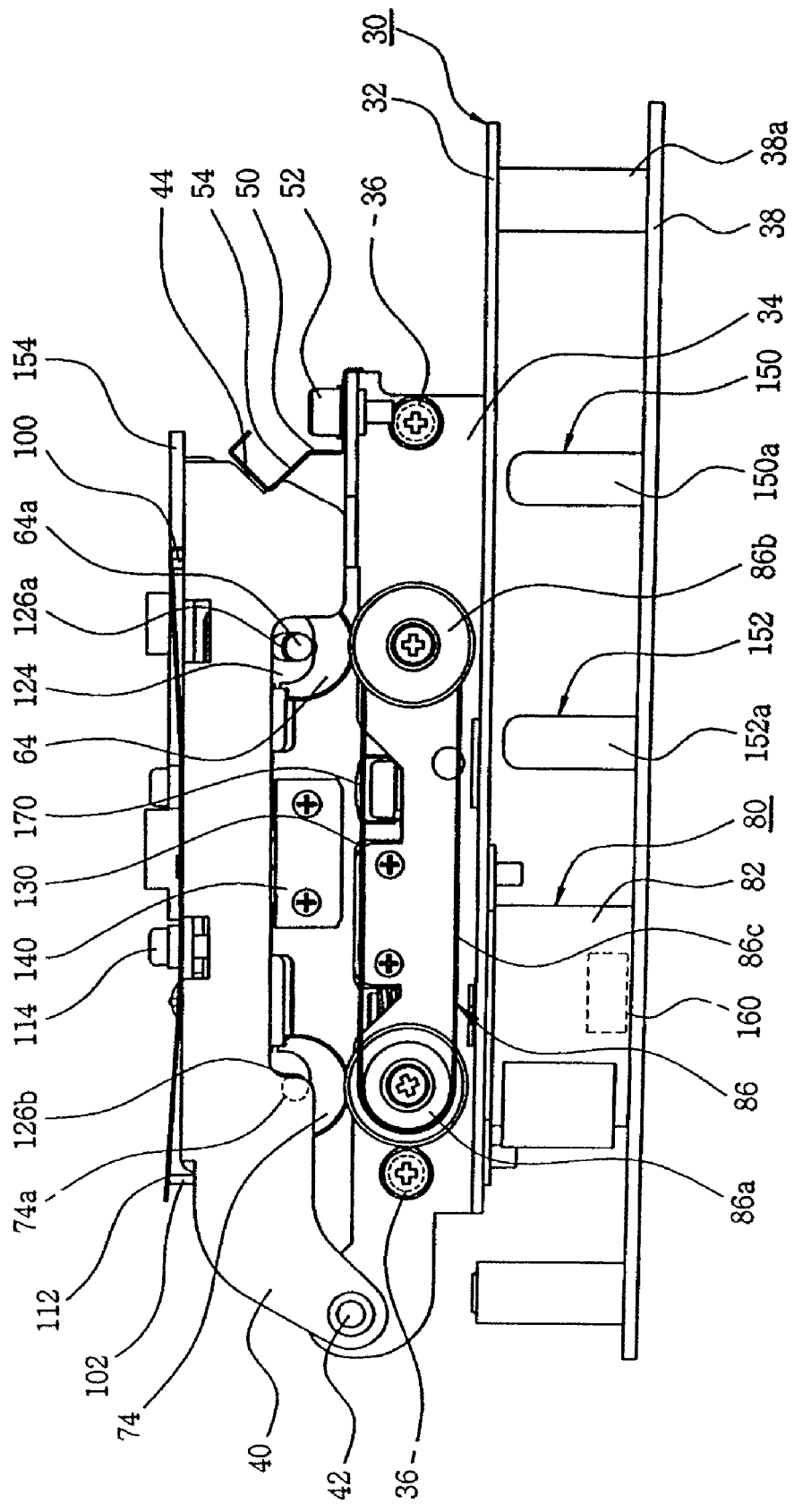
FIG. 12 is a right side elevational view showing the configuration of a main frame, a moving frame, a belt transmission mechanism and a pressing device employed in a double side image scanner in accordance with the present invention, with an inner pressing cover removed.

Referring to FIGS. 3, 11 and 12, by removing the snap hooks 54 of the locks 50 from the locking grooves 204 of the moving frame 40, it becomes possible to turn the moving frame 40 about the pivot 42 together with the cover 20 and hence to open the cover 20. If the cover 20 is opened, the first and second feed rollers 62 and 72, the first and second idle rollers 64 and 74, and the first and second image sensors 130 and 140 are all exposed to the outside. In this condition, the user can wipe out, with an optical purpose cleaning fabric, the contaminants stuck to the surface of the first and second image sensors 130 and 140. Opening the cover 20 and dislodging the contaminants in this manner is effective in avoiding any occurrence of errors in the image data. It is a matter of course that the foreign matters adhered to the surfaces of the first and second feed rollers 62 and 72 and the first and second idle rollers 64 and 74 can be dislodged with the use of a cleaning fabric. This helps to prevent any slipping or sticking of the medium 2 and to avoid any occurrence of jitter, thereby assuring accuracy and reliability of the image data acquired. Furthermore, in the event that the medium 2 is jammed and stopped in the loading track 98 during the course of loading and unloading operations, an appropriate measure can be easily and rapidly taken to remove the jam by opening the cover 20 in the above-noted manner.

Referring to FIGS. 2 and 3, the user can load the medium 2 through the guide track 12 in front of the case 10 and then unload the medium 2 from the inlet outlet opening 22 at the rear of the case 10. Inversely, it is also possible for the user to load the medium 2 through the inlet outlet opening 22 at the rear of the case 10 and then unload the medium 2 from the guide track 12 in front of the case 10. Such an ability to load and unload the medium 2 from any one of the front and rear sides of the case 10 helps to improve the convenience in scanning the medium 2.

Referring to FIGS. 17 and 18 which illustrate the magnetic stripe reader 280 disposed in front of the first roll feed 160, the front end 2a of the medium 2 enters between the magnetic stripe reader 280 and the pinch roller 304 by the user's pushing force applied to the medium 2. If the front end 2a of the medium 2 moves past the light emitting element 150a and the light receiving element 150b of the first medium sensor 150 and hence if the motor 82 is caused to rotate clockwise, the first feed roller 62 and the first idle roller 64 begin to rotate. As the medium 2 is loaded by the cooperative action of the first feed roller 62 and the first idle roller 64, the magnetic stripe reader 280 reads out the data stored in the magnetic stripe 4 of the medium 2. In this regard, the magnetic stripe reader 280 performs its reading task well before the medium 2 makes contact with the first image sensor 130, the second image sensor 140, the second roll feed 70 and the like, and is subjected to variation in the loading speed and the frictional force. Thus, at the time when the magnetic stripe reader 280 reads out the data from the magnetic stripe 4, it is possible to enhance the accuracy of tracking and prevent any occurrence of jitter and loading errors, thereby assuring increased reliability of the data.

As described in the foregoing, the double side image scanner according to the present invention is capable of simultaneously scanning images from opposite surfaces of a medium in an increased image quality and with enhanced scanning accuracy and reliability. Furthermore, the double side image scanner can prevent any loading error with a simple structure and can make accurate and smooth rectilinear loading and constant-speed loading come true. The double side image scanner can compensate deformation of a medium through the use of a pressing structure, thus minimizing distortion of an image. The double side image scanner can enjoy an ability to dislodge contaminants on an image sensor and a magnetic stripe reader, while allowing the jam of a medium to be removed with ease. The double side image scanner makes it possible to load a medium from the front side and the rear side of the image scanner, thereby improving the convenience in scanning. The provision of a magnetic stripe reader in the double side image scanner makes it possible not only to scan images of a medium but also to accurately read out the data of a magnetic stripe attached to the medium. In addition, the double side image scanner allows a magnetic stripe reader to accurately and stably track a magnetic stripe through the use of a simple mechanism.

Although preferred embodiments of the present invention have been described in detail, it will be apparent to those skilled in the art that various changes or modifications may be made thereto within the scope of the invention defined by the appended claims.

What is claimed is:

1. A double side image scanner comprising:
   a case having a top surface and a guide track provided on the top surface for guiding a medium, the guide track having a reference loading line;
   a main frame mounted inside the case;
   a first roll feed including a first feed roller mounted on a front side of the guide track and a first idle roller disposed above the first feed roller for cooperating with the first feed roller to load the medium;
   a second roll feed including a second feed roller mounted on a rear side of the guide track and a second idle roller disposed above the second feed roller for cooperating with the second feed roller to load the medium;

a drive means for rotating the first feed roller and the second feed roller;

a first image sensor provided on the guide track between the first feed roller and the second feed roller for scanning one surface of the medium to acquire image data;

a second image sensor provided between the first idle roller and the second idle roller for scanning the other surface of the medium to acquire image data;

a tracking means provided at one side of the main frame for pushing and biasing a first flank end of the medium toward the reference loading line to bring a second flank end of the medium into alignment with the reference loading line;

a moving frame rotatably connected to a rear end of the main frame; and a pressing means vertically movably mounted on a bottom portion of the moving frame for pressing the medium against the guide track, wherein the pressing means comprises:

an inner pressing cover vertically movably mounted on the bottom portion of the moving frame for pressing the medium into planar shape, wherein the inner pressing cover defines a medium loading track between the guide track and a lower surface of the inner pressing cover, wherein the first idle roller and the second idle roller protrude downwardly through the inner pressing cover, and wherein the second image sensor is exposed to the medium loading track through the inner pressing cover;

first and second brackets respectively secured to front and rear sides of the inner pressing cover, each of the first and second brackets having first and second guide slots extending along opposite flank sides of a corresponding one of the first and second brackets;

a first shaft vertically movably inserted at opposite ends into the first guide slots of the first and second brackets;

a second shaft vertically movably inserted at opposite ends into the second guide slots of the first and second brackets; and a spring means for resiliently biasing the inner pressing cover to press the medium.

2. The double side image scanner as recited in claim 1, further comprising:

a main cover openably attached to the top surface of the case, the moving frame being secured to a lower surface of the main cover, and a lock mounted on the main frame for restraining a front end of the moving frame.

3. The double side image scanner as recited in claim 2, wherein the guide track is formed in such a manner that the medium can be loaded and unloaded from a front side of the case and wherein an inlet outlet opening through which the medium is loaded and unloaded is formed at rear sides of and between the case and the main cover, the inlet outlet opening aligned with the guide track in a coplanar relationship.

4. The double side image scanner as recited in claim 1, wherein the first feed roller and the second feed roller have axes aligned on a first plane, the first idle roller and the second idle roller having axes aligned on a second plane parallel to the first plane, the first feed roller and the second feed roller made of a soft material, the first feed roller having a diameter greater than that of the second feed roller.

5. The double side image scanner as recited in claim 1, wherein the drive means comprises:

a motor mounted on a rear side of the main frame for generating a driving force;

a gear arrangement for transferring the driving force of the motor to the second feed roller; and a belt transmission mechanism for transmitting a rotational force of the second feed roller to the first feed roller.

6. The double side image scanner as recited in claim 1, wherein the tracking means comprises:

a pair of pivots mounted to the one side of the main frame;

a side push plate rotatably coupled to the pivots for pushing the first flank end of the medium toward the reference loading line to bring the second flank end of the medium into alignment with the reference loading line; and a spring attached to the pivots for resiliently biasing the side push plate toward the reference loading line of the guide track.

7. The double side image scanner as recited in claim 1, wherein the gap of the medium loading track initially created between the guide track and the lower surface of the inner pressing cover is smaller than the thickness of the medium.

8. The double side image scanner as recited in claim 1, wherein the spring means of the pressing means comprises first and second leaf springs mounted on top lateral sides of the moving frame and extending along a loading direction of the medium in a mutually parallel relationship for downwardly pressing and biasing the first and second brackets.

9. The double side image scanner as recited in claim 8, wherein the first and second leaf springs are provided at respective ends thereof with stoppers for engaging with and restraining one of the first and second brackets.

10. The double side image scanner as recited in claim 1, further comprising a link means vertically movably mounted between the moving frame and the pressing means and connected to the first and second idle rollers for causing the first and second idle rollers to move together.

11. The double side image scanner as recited in claim 10, wherein the link means comprises:

first and second shafts mounded for up-down movement with respect to the pressing means and extending in a loading direction of the medium in a mutually parallel relationship;

a first link rotatably attached to the first shaft;

a second link rotatably attached to the second shaft; and a spring retained at opposite ends by the first and second links for resiliently biasing the first and second idle rollers into contact with the first and second feed rollers, the first and second idle rollers vertically movably mounted on front and rear sides of the first and second links.

12. The double side image scanner as recited in claim 1, further comprising a magnetic stripe reader exposed to a top surface of the guide track for reading out data stored in a magnetic stripe, wherein the medium has the magnetic stripe attached to a lower surface of the medium.

13. The double side image scanner as recited in claim 12, wherein the magnetic stripe reader is supported on a resilient holder mounted on the case.

14. The double side image scanner as recited in claim 13, wherein the resilient holder comprises:

a body for accommodating the magnetic stripe reader;

first and second elastic bridges extending downwardly from lateral sides of the body; and securing pieces extending upwardly from the first and second elastic bridges and having peripheral edges severed from the first and second elastic bridges, each of the securing pieces having a hole through which a screw is inserted to fasten the resilient holder to the case.

15. The double side image scanner as recited in claim 12, further comprising a pinch roller for pressing the medium into contact with the magnetic stripe reader, wherein the magnetic stripe reader is disposed in front of the first roll feed.

16. The double side image scanner as recited in claim 1, further comprising a third image sensor for irradiating ultraviolet rays toward the medium to acquire image data of the medium.

17. The double side image scanner as recited in claim 1, further comprising a third image sensor for irradiating infrared rays toward the medium to acquire image data of the medium.

18. The double side image scanner as recited in claim 1, further comprising first and second medium sensors provided at front and rear sides of the first roll feed for sensing presence of the medium loaded.

* * * * *